United States Patent
Crawforth et al.

[19]

[11] Patent Number: 6,075,604
[45] Date of Patent: Jun. 13, 2000

[54] APPARATUS FOR MEASURING CURVATURE OF MAGNETIC READ/WRITE HEAD SLIDERS

[75] Inventors: Linden James Crawforth; Chie Ching Poon, both of San Jose; Andrew Ching Tam, Saratoga, all of Calif.

[73] Assignee: International Business Machines Corporation, Armonk, N.Y.

[21] Appl. No.: 09/189,311

[22] Filed: Nov. 10, 1998

[51] Int. Cl.$^7$ .................................................. G01B 11/24
[52] U.S. Cl. ............................................................ 356/371
[58] Field of Search ............................................ 356/371

[56] References Cited

U.S. PATENT DOCUMENTS

| | | | |
|---|---|---|---|
| 3,885,875 | 5/1975 | Rosenfeld et al. | 356/371 |
| 4,289,400 | 9/1981 | Kubota et al. | 356/371 |
| 4,332,477 | 6/1982 | Sato | 356/371 |
| 4,735,508 | 4/1988 | Bellio | 356/371 |
| 5,266,769 | 11/1993 | Deshpande et al. | 219/121.69 |
| 5,488,478 | 1/1996 | Bullock et al. | 356/371 |
| 5,633,718 | 5/1997 | Menning | 356/371 |

*Primary Examiner*—Richard A. Rosenberger
*Attorney, Agent, or Firm*—Lumen Intellectual Property Services

[57] ABSTRACT

An apparatus for measuring a curvature of an air bearing surface (ABS) of a read/write magnetic head slider. The apparatus has two lasers which direct laser beams toward the ABS. The beams strike the ABS and are specularly reflected. The reflected beams are directed toward a position sensing optical detector. The distance between the points where the beams strike the detector is indicative of the curvature of the ABS. The beams my be alternately pulsed so that the detector outputs a DC-biased square wave signal, the voltage-step difference of which indicates the curvature. In another embodiment, a single laser beam is scanned by a scanner and passed through a scan lens. The scan lens is located one focal length from the scanner. A reflected laser beam is reflected from the ABS and is collected by the scan lens. The reflected laser beam is then directed toward a position sensing optical detector. The detector is located outside the focal plane of the scan lens. The position of the laser beam on the detector is dependent upon the curvature of the ABS. Then the magnitude of the detector output provides a measure of the curvature.

8 Claims, 15 Drawing Sheets

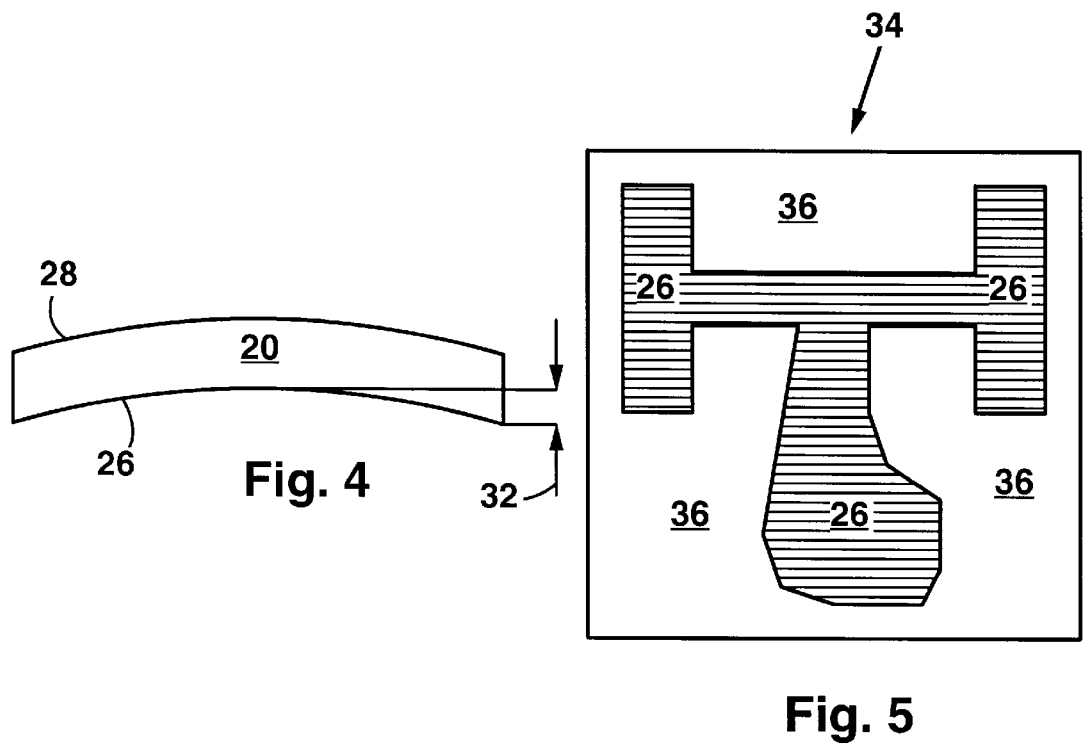
Fig. 4
Fig. 5
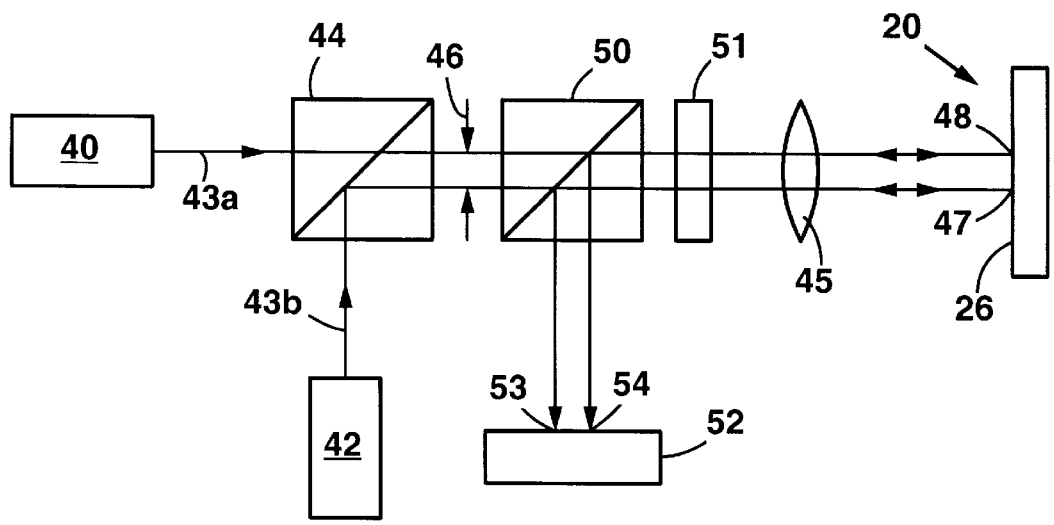
Fig. 6A

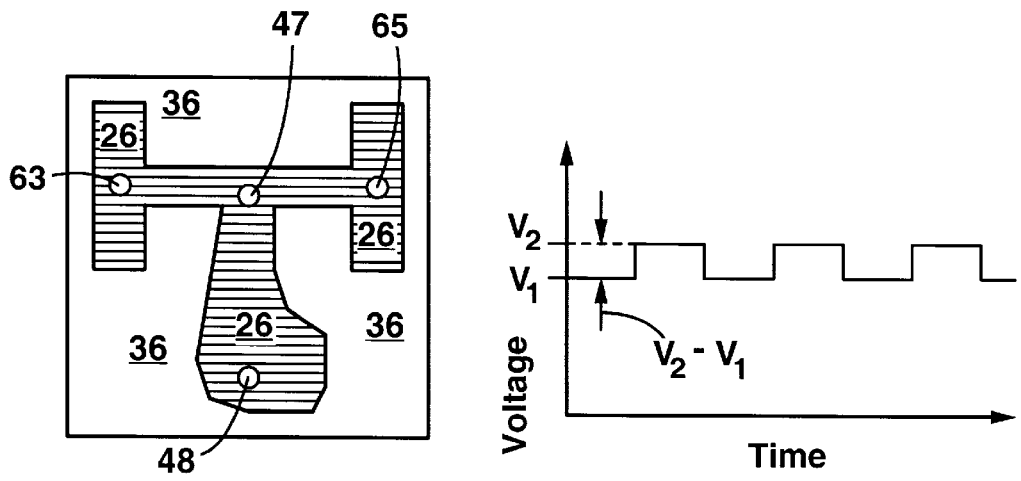
Fig. 6B
Fig. 6C
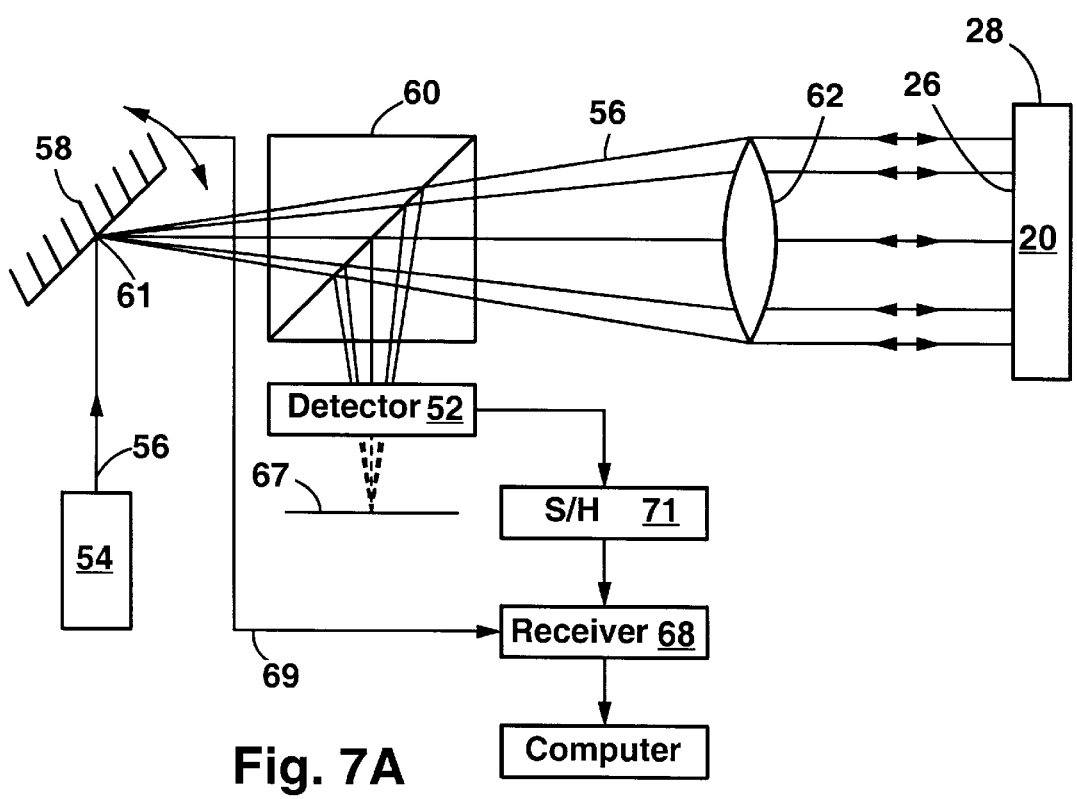
Fig. 7A

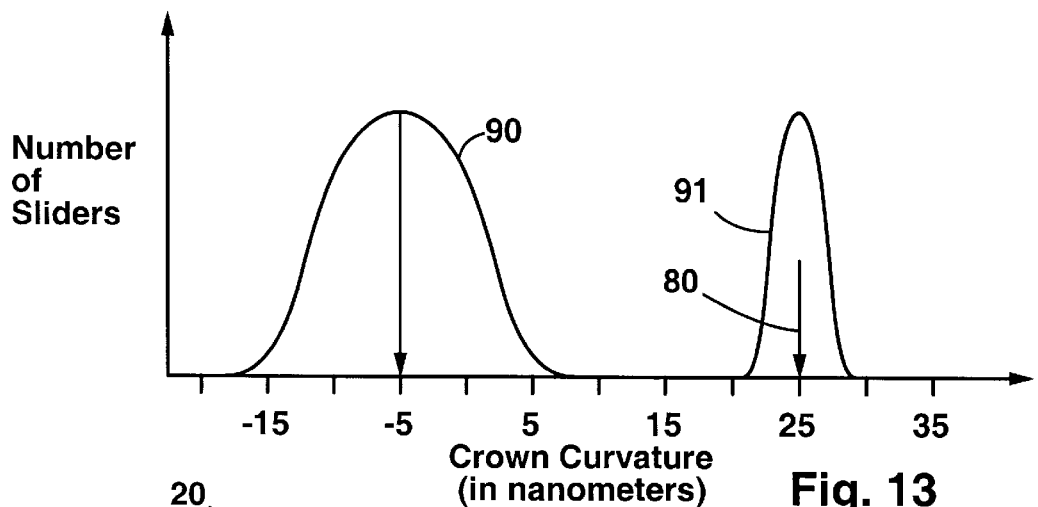
Fig. 13
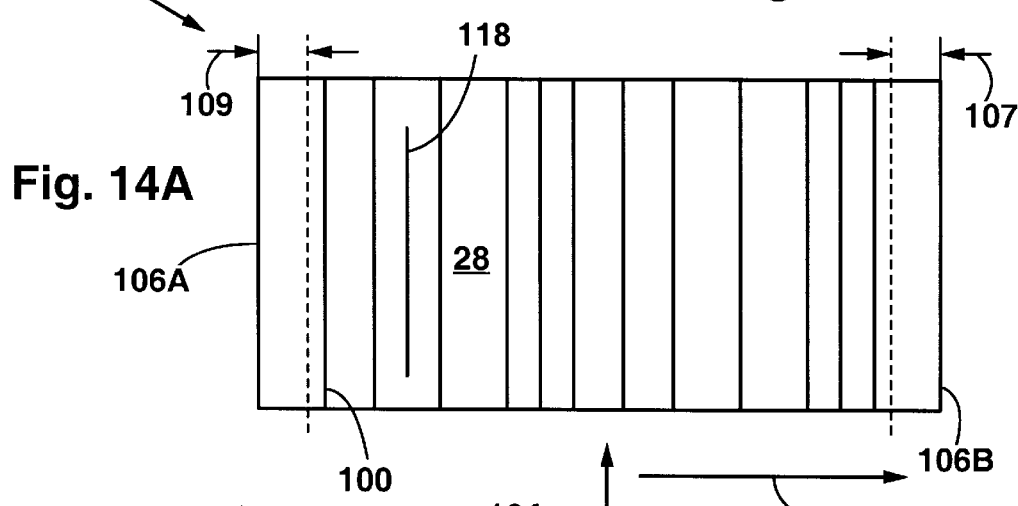
Fig. 14A
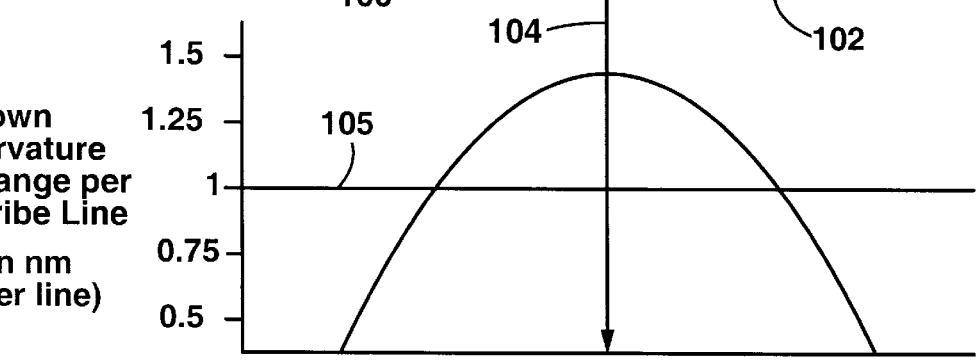
Fig. 14B   Location of Scribe Line on Slider

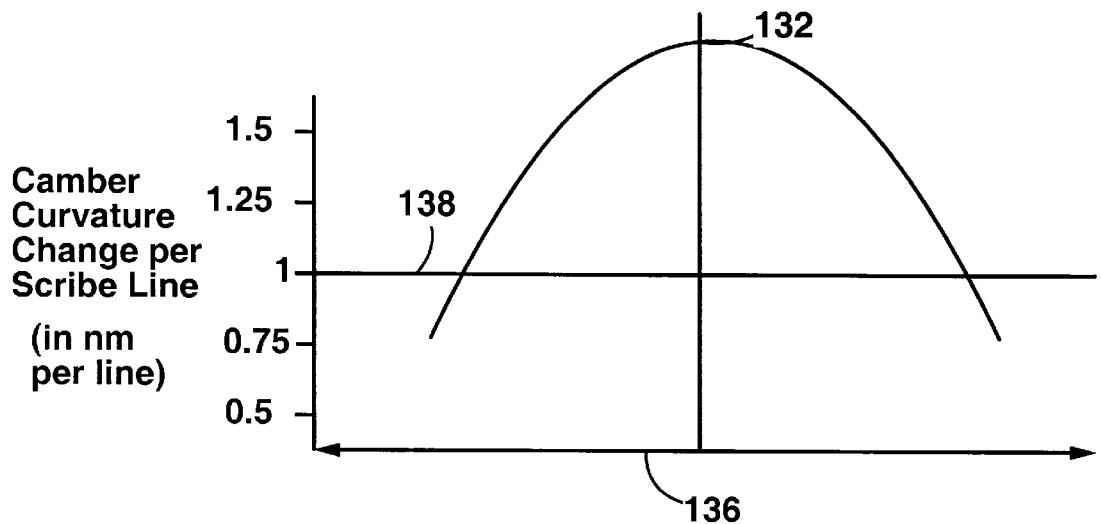
Fig. 23   Location of Camber Scribe Line on Slider
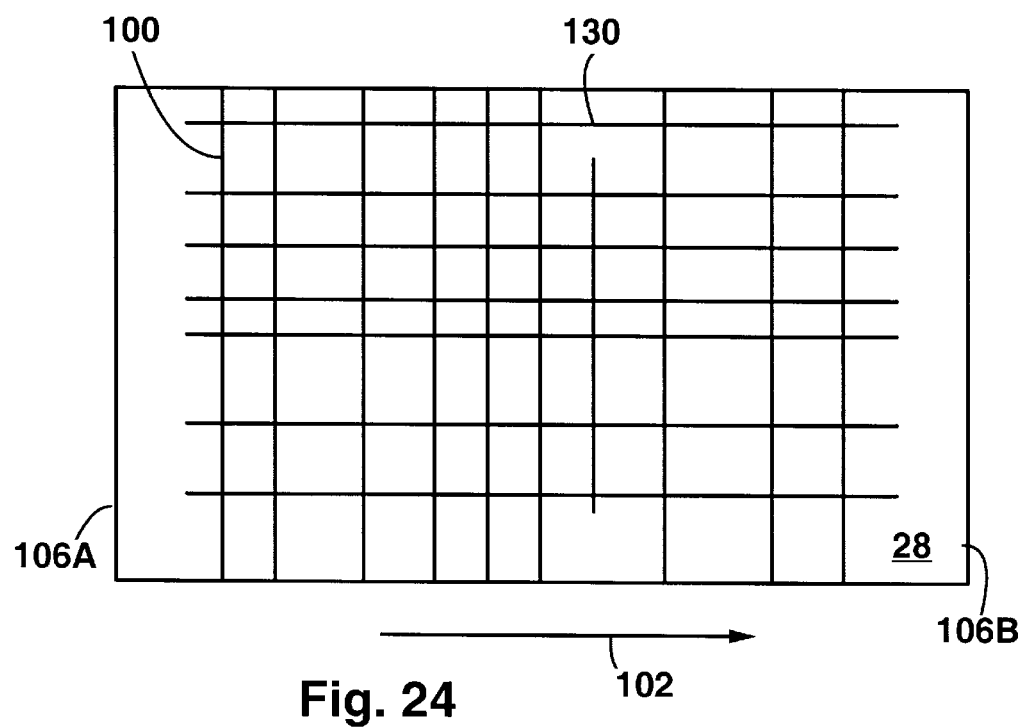
Fig. 24

APPARATUS FOR MEASURING CURVATURE OF MAGNETIC READ/WRITE HEAD SLIDERS

FIELD OF THE INVENTION

This invention relates generally to laser scribing tools for scribing semiconductor chips and the like. More particularly, it relates to an apparatus for measuring the curvature of magnetic read/write sliders.

BACKGROUND OF THE INVENTION

Hard drives utilizing magnetic data storage disks are used extensively in the computer industry. Each magnetic data storage disk in a hard drive has an associated slider which is used to magnetically read and write on a disk surface. In operation, the magnetic data storage disks are rotated and a slider is held very close to the surface of each disk surface. The motion of the disk past the slider allows data communication between the slider and disk surface.

The distance between the slider and disk must be accurately controlled. Typically, the slider is shaped to fly upon a cushion of moving air formed by the rapidly moving disk surface. The surface of the slider closest to the disk surface is called an air bearing surface. The air bearing surface has a shape which is designed to provide a small but stable flying height between the slider and disk. The slider must not touch the disk surface during operation because damage can result. Also, it is desirable to maintain as small a flying height as possible, because this increases the amount of data which can be stored. As flying height is reduced, it becomes increasingly difficult to maintain the flying height accuracy to the degree required for reliable recording and reading of data.

The shape of the slider has a substantial effect upon fly height. More specifically, the flying height is dependent upon the average curvature of the air bearing surface of the slider. The curvature of the air bearing surface is often affected by the manufacturing processes used to make the slider. Cutting end lapping of the slider (either the air bearing surface or a surface opposite to the air bearing surface) often causes stress variations in the slider which distort the shape of the air bearing surface. After lapping, it is almost always necessary (for high storage density applications) to adjust the curvature of the air bearing surface to a desired target curvature.

U.S. Pat. No. 5,266,769 to Deshpande et al. discloses a method of adjusting the curvature of the air bearing surface of a slider by scribing a back surface of the slider. The scribing removes material from the back surface, thereby modifying the mechanical stress in the slider and controllably changing the curvature of the air bearing surface. Scribing may be performed with a laser, sandblasting tool or the like. A curvature measuring tool may monitor the curvature of the air bearing surface as material is removed, thereby providing feedback control if desired. A problem with the method of Deshpande is that sliders are most efficiently made in rows, and each slider in a row may have a different amount of stress. This means that each slider must have a different amount of material removed in order for the sliders to have the same air bearing surface curvature. Deshpande does not disclose a method for individually controlling the curvature of sliders in a row. Deshpande assumes that all sliders in a row require the same curvature adjustment. It would be an advance in the art to provide a row of sliders with individually controlled curvature.

Also, it is important to be able to measure the curvature of the air bearing surface quickly and accurately. Conventional interferometric curvature measuring tools are too slow to be practical in the mass production of sliders. Deshpande does not disclose a rapid curvature measurement technique for sliders. Also, when measuring the curvature of a slider, it may be useful to restrict the measurement to certain regions of the air bearing surface.

OBJECTS AND ADVANTAGES OF THE INVENTION

Accordingly, it is a primary object of the present invention to provide an apparatus for measuring curvature of a slider that:

1) provides fast, accurate, and repeatable curvature measurements; and 2) can measure curvature only in regions of an air bearing surface where measurements are desired.

These and other objects and advantages will be apparent upon reading the following description and accompanying drawings.

SUMMARY OF THE INVENTION

These objects and advantages are attained by an apparatus having a source for two laser beams and a means for directing the beams toward an air bearing surface (ABS) of a slider. The laser beams are incident upon the air bearing surface at different locations of the ABS. The apparatus also has a position sensing optical detector for receiving the laser beams after they reflect from the ABS. The distance between the points where the laser beams strike the detector allows one to determine the curvature of the ABS. Different curvatures of the ABS will result in the Laser beams striking the detector at different points. The laser beams are alternately pulsed so that the detector outputs a DC-biased square wave signal. The voltage step difference of the square wave provides a measure of the curvature of the ABS.

These objects and advantages are also attained by an apparatus having a position sensing optical detector and a scanner for receiving and scanning a laser beam. The apparatus also has a scan lens located one focal length from the scanner. A beamsplitter is disposed between the scan lens and scanner. The laser beam is scanned by the scanner and then passes through the scan lens and is incident upon the ABS. The laser beam reflects from the ABS and is then incident upon the beamsplitter, which directs it to the detector. Preferably, the detector is located outside the focal plane of the lens. The beam is scanned across the ABS. The amplitude of the detector output provides a measure of the curvature of the ABS. Preferably, the beamsplitter is a polarizing beamsplitter and a quarter-wave plate is located between the polarizing beamsplitter and the slider. This assures that nearly all of the reflected beam is directed toward the detector.

The scanner can be oscillated so that the laser beam is scanned over the ABS. Also, the apparatus can include a phase sensitive receiver in communication with the detector. The phase sensitive receiver is tuned to the frequency at which the scanner is oscillated. Preferably, the detector is located outside the focal plane of the scan lens.

DESCRIPTION OF THE FIGURES

FIG. 4 shows how the measurement of curvature is defined in the present invention.

FIG. 5 shows an air bearing surface (ABS) of the slider.

FIG. 6A shows an apparatus according to the present invention which can measure the curvature of the ABS.

FIG. 6B shows four points on the ABS used by the apparatus of FIG. 6A to measure curvature-two points for crown curvature, and two points for camber curvature.

FIG. 6C shows the output of a position sensing detector in the apparatus of FIG. 6A when lasers beams are alternately pulsed.

FIG. 7A shows another apparatus according to the present invention which can measure the curvature of the ABS.

FIG. 13 shows the curvature distribution of a group of sliders before and after being processed.

FIG. 14A shows a back surface of a slider scribed according to the present invention. FIG. 14A is physically aligned with FIG. 14B.

FIG. 14B shows a graph illustrating how the effect on curvature provided by a crown scribe line depends upon the crown scribe line location.

FIG. 23 shows a graph illustrating how the effect on curvature provided by a camber scribe line depends upon the camber scribe line location.

FIG. 24 shows a slider which has both crown scribe lines and camber scribe lines.

DETAILED DESCRIPTION

The present invention provides an apparatus for measuring and adjusting the curvature of magnetic sliders used for transducers in data storage hard drives.

Figure 1:
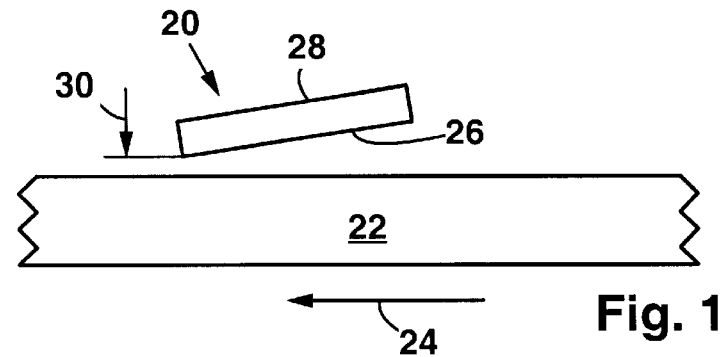
FIG. 1 (prior art) shows a closeup view of a slider in operation reading/writing data to a magnetic data storage disk.

FIG. 1 shows a closeup side view of a slider 20 held above a hard drive disk 22 which is moving in the direction of the arrow 24. The slider 20 has an air bearing surface (ABS) 26 facing the disk 22. The slider also has a back surface 28. The slider 20 is inclined with respect to the disk 22 so that air moving along with the disk provides aerodynamic lift to the slider 20. For reliable operation and maximum data storage in a hard drive, a fly height 30 should be small, stable, and well defined. The shape and curvature of the air bearing surface 26 is very important for determining the fly height 30.

Figure 2A:
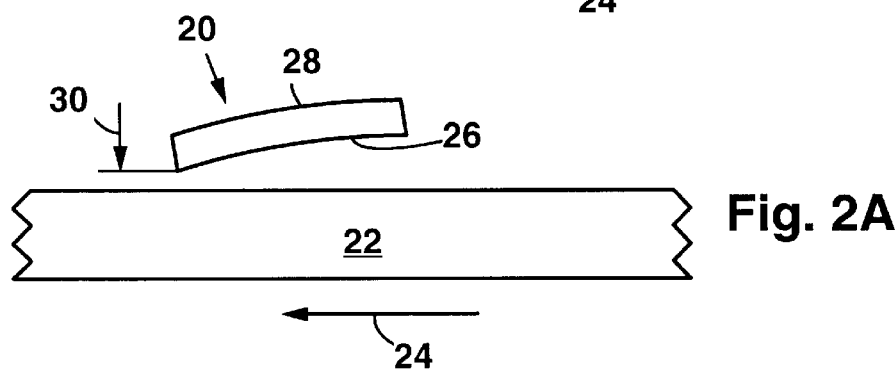
FIG. 2A shows an example of a slider with negative crown curvature.
Figure 2B:
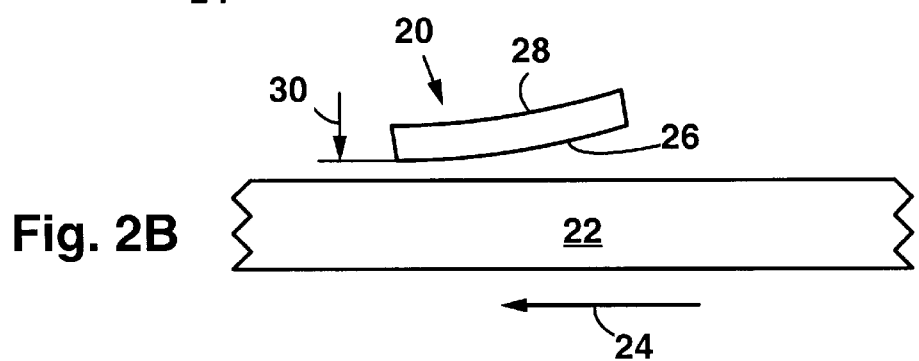
FIG. 2B shows an example of a slider with positive crown curvature.

The shape of the air bearing surface 26 is described in terms of two types of curvature, crown and camber. FIG. 2A shows a side view of a slider which has a concave air bearing surface 26 which appears curved when viewed from the side. The slider is said to have negative crown. Negative crown is caused by residual stress in the slider, which is often a result of lapping the ABS. Negative crown is generally undesirable for air bearing surfaces. FIG. 2B shows a slider 20 having an ABS with positive crown. A small value of positive crown is generally desirable for air bearing surfaces 26. An ABS with a small, positive value of crown provides a more stable and predictable fly height 30.

It is noted that it is the average curvature of the ABS 26 which is important. Therefore, the curvature can be expressed as a single number indicating the average curvature. The exact shape of the curvature does not have a significant effect upon fly height 30, provided that the average curvature is a well-defined value. The fly height 30 is approximately proportional to the average curvature. For example, a typical fly height sensitivity is about 0.25 nanometers of fly height 30 change for each nanometer of crown curvature change.

Figures 3A, 3B:
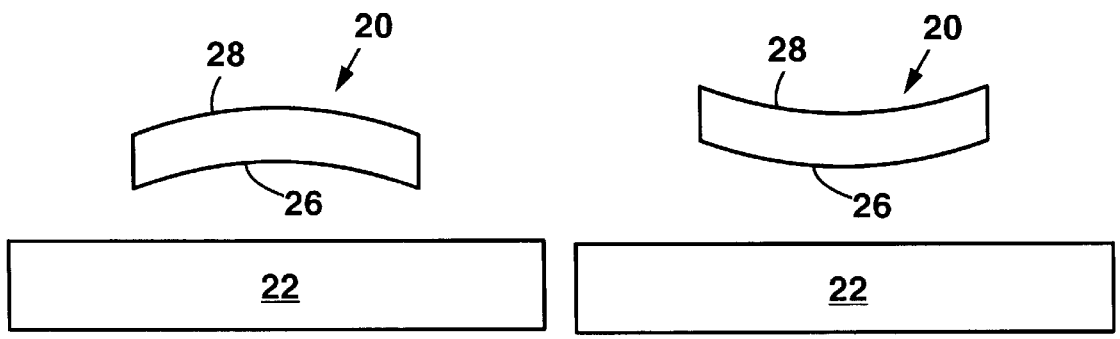
FIG. 3A shows an example of a slider with negative camber curvature.
FIG. 3B shows an example of a slider with positive camber curvature.

FIG. 3A shows a front view of a slider 20 with a curved ABS which appears curved when viewed from the front (i.e. in the direction of the arrow 24). The disk 22 is moving into the page. The slider is said to have negative camber. Negative camber is generally undesirable for air bearing surfaces because the ABS is more likely to contact the disk. FIG. 3B shows a slider having positive camber. A small value of positive camber is generally desirable for air bearing surfaces 26. An ABS with a small, positive value of camber curvature provides a more stable and predictable fly height 30.

FIG. 4 shows how crown and camber (most generally, curvature) is measured in the present invention. Curvature is measured in units of distance defined by the length 32. Length 32 is the distance between the highest and lowest points on the ABS 26. A negative curvature value indicates that the ABS is concave; a positive curvature value indicates that the ABS is convex (this is true for both crown and camber curvature). Length 32 is either the crown curvature or camber curvature, depending upon the orientation of the slider 20.

FIG. 5 shows a closeup view of the slider ABS. The ABS 26 does not extend over an entire bottom surface 34 of the slider 20. Portions 36 of the bottom surface of the slider are recessed and therefore do not substantially affect the fly height 30. The ABS 26 is polished and raised above the remaining portions 36. Therefore, when measuring curvature, it is only necessary to measure the curvature of the ABS 26 and not the portions 36.

FIG. 6A shows an apparatus according to the present invention for measuring the curvature of the ABS 26. Two lasers 40, 42 supply laser beams 43a, 43b to a first beamsplitter 44. The lasers 40, 42 and beamsplitter are located so that the beams after having passed through the beamsplitter 44 are spaced apart by a distance 46 and parallel. The slider 20 whose curvature is to be measured is placed a distance away from the beamsplitter 44 in the path of the laser beams 43a, 43b. A lens 45 is located in front of the slider 20. The beams 43a, 43b are incident upon the ABS 26 at two spaced apart points 47, 48. The apparatus measures the curvature between the points 47, 48. FIG. 6B shows a top view of the ABS 26 which shows where the points 47, 48 are located on the ABS 26. Of course, the points 47, 48 can be located anywhere on the ABS 26 where a curvature measurement is required. If camber curvature is being measured, then the beams will be incident upon the ABS 26 at locations 63, 65 (i.e. horizontally spaced apart locations). The beams 43a, 43b reflect from the ABS 26 and enter a second beamsplitter 50 which directs the reflected beams to a position sensing detector 52. The beams are incident on the detector 52 at spaced apart points 53, 54. The distance between the points 53, 54 determines the output of the detector 52 and is indicative of the curvature of the ABS 26. Preferably, the optical path length from the ABS to the detector (i.e. from point 47 to point 53, and from point 48 to point 54) is in the range of about 25–300 millimeters.

Preferably, the second beamsplitter 50 is a polarizing beamsplitter and a quarter-wave plate 51 is located between the second beamsplitter 50 and ABS 26. Proper alignment between the polarizing beamsplitter 50 and quarter-wave plate assures that all the light reflected from the ABS is directed toward the detector 52.

It is noted that the slider 20 may be made of a composite ceramic material having a predetermined grain sizes (e.g. TiC and Alumina composite ceramics). The beam spot sizes at locations 47 and 48 must be large compared to the grain size in order to obtain accurate curvature measurements. The beam spot sizes should also be small enough to provide sufficient spatial resolution.

If the ABS 26 is flat, then the distance between points 47 and 48 is the same as the distance between points 53 and 54. If the ABS 26 is concave (but not excessively concave), then the distance 47–48 will be greater than the distance 53–54. If the ABS 26 is convex, then the distance 47–48 will be less than the distance 53–54. Therefore, the apparatus shown can measure positive and negative curvature between any two points on the ABS 26. By appropriately orienting the beams 43a, 43b with respect to the slider 20, both crown and camber of the slider 20 can be measured.

In operation, beams 43a and 43b are alternately pulsed such that only one beam is on at a time. Preferably, the lasers 40, 42 are diode lasers and are alternately switched. This produces an output from the detector 52 shown in FIG. 6C. The output can be described as being a DC-biased square wave signal. The voltage step difference $(V_2-V_1)$ is proportional to the distance between points 53 and 54, which provides a measure of the curvature of the ABS 26. In a particular embodiment the lasers are pulsed at a rate of about 100 kHz. If each curvature measurement is averaged over 10 cycles, then a curvature measurement is provided every 100 microseconds. Preferably, a lock-in amplifier tuned to the frequency of the pulsed lasers 40, 42 (i.e. 100 kHz in the above example) is used to measure the voltage step difference. Alternatively, an RMS voltage meter is used to measure the voltage step difference.

The accuracy of the measurements depends upon the total distance traversed by the beams after being reflected from the ABS 26. Typically, the optical path length between points 47 and 53 is about 25 to 300 millimeters. An apparatus according to the present invention can measure curvature to within 1 nanometer.

FIG. 7A shows another embodiment of the present invention for measuring the crown and camber curvature of the ABS 26. A laser 54 directs a laser beam 56 towards a scanner 58. The scanner 58 can be a scanning mirror or an acousto-optical scanner, for example. The scanner may scan the laser beam 56 in one or two dimensions. The scanner directs the beam 56 through a beamsplitter 60 and through a scan lens 62. The scan lens 62 is one focal length away from the beam pivot scan point 61. The slider 20 is located behind the lens 62. The beam 56 strikes the ABS 26 substantially perpendicularly. The beamsplitter 60 directs a reflected bear from the ABS 26 towards the position sensing detector 52. The detector 52 is preferably located as far away as possible from a scan lens focal plane 67 of the lens 62 such that the reflected beam is always incident upon the detector 52. Typically, the distance between focal plane 67 and detector 52 is in the range of about 1–3 millimeters. This assures that there will be an oscillatory signal from the detector for many different values of curvature. In FIG. 7A, the detector is shown located in front of the focal plane 67 (i.e. between the beamsplitter 60 and focal plane 67), however, the detector can also be located behind the focal plane 67.

Alternatively, the detector 52 is located one focal length from the lens 62 so that the surface of the detector is coincident with the focal plane 67. In this case, if the ABS 26 is flat, then the beam will always be incident upon the same point of the detector 52 as the beam is scanned and no oscillatory signal is produced. The amplitude of the signal from the detector indicates the magnitude of curvature, and the phase of the signal indicates whether the curvature is positive or negative (i.e. convex or concave).

Figure 7B:
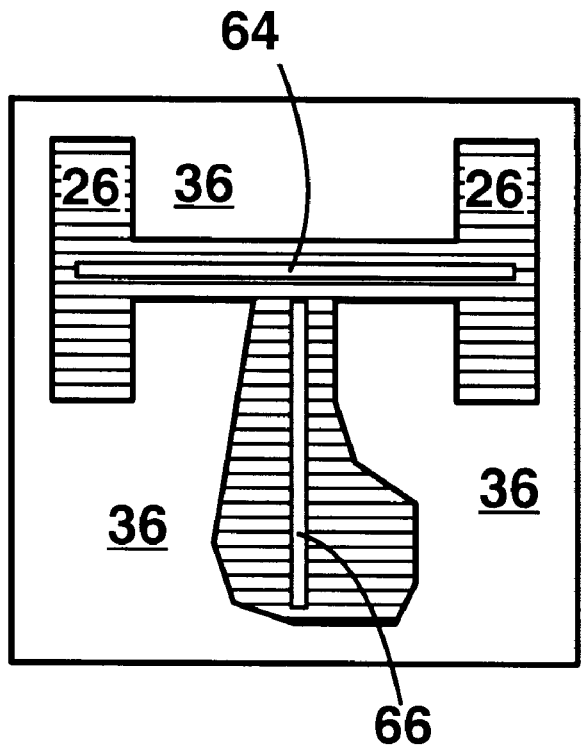
FIG. 7B shows scan lines on the ABS used by the apparatus of FIG. 7A to measure crown curvature and camber curvature.

FIG. 7B shows a top view of the ABS 26 showing a beam trajectory 66 over the ABS 26. The beam trajectory 66 is the path over which the beam 56 moves as the scanner operates. The beam trajectory shown in FIG. 7B is a straight line, but curved trajectories can also be used. The trajectory 66 shown would be used to measure crown curvature. An orthogonal trajectory 64 would be used to measure camber curvature. Of course, with appropriate control of the scanner, both crown and camber curvature of the slider 20 can be measured.

Figure 8:
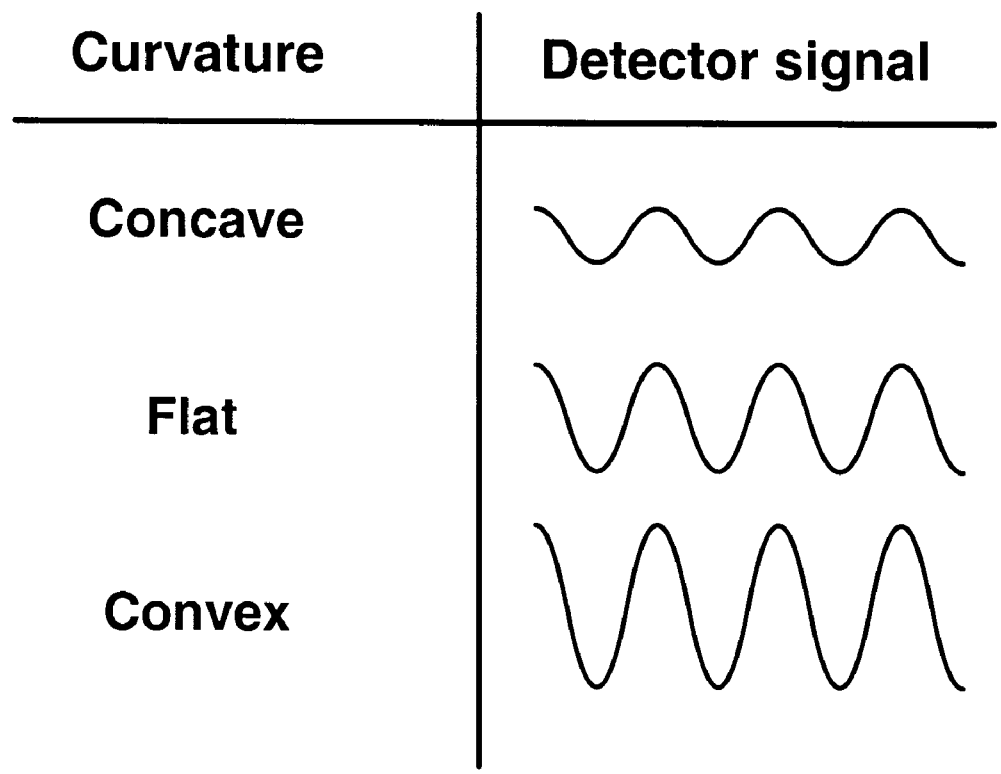
FIG. 8 shows a table illustrating the signals produced by the apparatus of FIG. 7A for different curvatures of the ABS.

The detector 52 preferably is in communication with a phase sensitive signal receiver 68 such as a lock-in amplifier referenced at the scan frequencies of the scanner. The position of the scanner is continuously monitored by the the signal receiver 68 as a phase reference 69. The lock-in amplifier 68 obtains independent phase references at different frequencies for each of the two dimensions. The amplitude of the signal from the detector 52 indicates the magnitude and direction of curvature (i.e. convex or concave). This is shown in the table of FIG. 8. The lock-in amplifier 68 can sensitively detect changes in phase and magnitude of the detector signal, and therefore provide accurate curvature measurements. The table of FIG. 8 assumes that the laser beam is scanned sinusoidally across the ABS.

The use of a lock-in amplifier also provides fast measurements. If the beam is scanned at a frequency of about 1500 Hz, and the integration time of the lock-in amplifier is set for 3 milliseconds, then each new measurement averages over 5 round trips of the laser beam. Approximately 300 separate curvature measurements can be performed per second. By comparison, an interferometric measurement according to prior art techniques typically requires about 5 to 15 seconds to complete.

In certain applications of the apparatus of FIG. 7A, it is desirable to scan the laser beam such that the beam trajectory 66 extends over remaining portions 36. This is necessary, for example, if the ABS 26 includes disconnected regions. However, while the beam is incident upon the remaining portion 36, the signal from the detector is not of interest because the remaining portion 36 is expressly not part of the ABS 26. Therefore, for the period of time during which the beam is directed toward the portion 36, the signal from the detector should be ignored. The signal from the detector is only useful while the beam is striking the ABS 26. The phase sensitive signal receiver 68 detects when the beam is striking remaining portions 36, and electronically blocks the signal generated by the position sensing detector 52 during these periods. In a preferred implementation, the signal from the detector is replaced with a signal from a sample-and-hold circuit 71 during times when the beam is directed toward the portion 36. The sample-and-hold circuit provides to the computer the most recent signal from the detector before the beam is moved off of the ABS 26.

Figure 9:
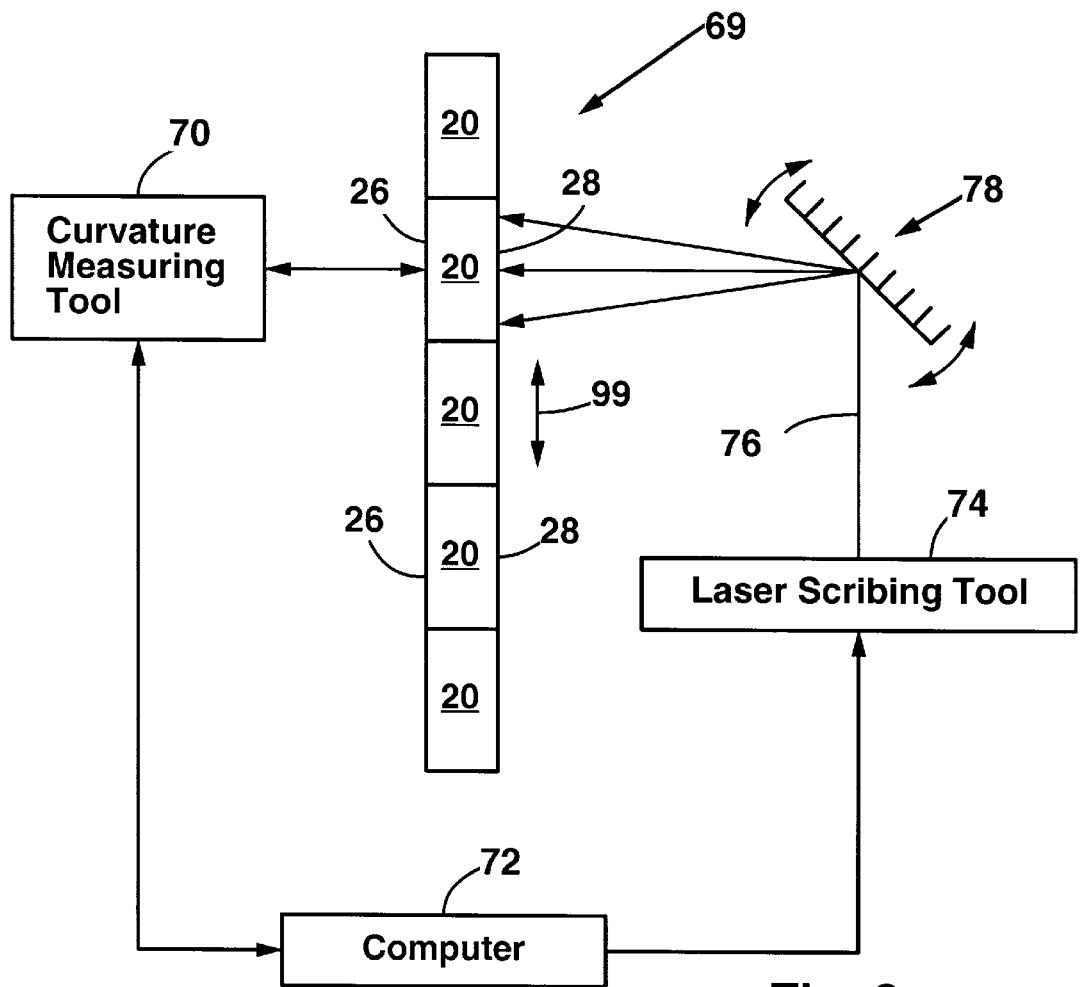
FIG. 9 shows a curvature adjustment tool which can adjust the curvature of sliders still attached in row form.

The present invention includes a method of scribing sliders 20. The method can be practiced with the apparatus disclosed in U.S. Pat. No. 5,266,769 to Deshpande. FIG. 9 shows an apparatus capable of performing the present slider scribing method on a monolithic row 69 of sliders 20 (here seen edge-on). The apparatus has a curvature measuring tool 70 such as the apparatus of FIG. 7A. The curvature measuring tool is in communication with a computer 72 which controls a laser scribing tool 74. The laser scribing tool produces a scribing beam 76 which is capable of ablating material from the back surface 28 of the sliders 20. A scanner 78 such as a mirror, XY-galvo scanner or acousto-optical scanner guides the scribing beam 76 over the back surface of the slider 20. The row 69 of sliders can be moved so that the curvature measuring tool 70 and scribing tool 74 can access all the sliders 20 in the row 69, one at a time. The curvature measuring tool 70 measures the curvature of each slider 20 individually. The scribing tool 74 scribes each slider individually. Therefore, although the sliders are still attached in row form, each slider is processed individually. Most sliders are oriented in the row 69 such that crown curvature is primarily adjusted by scribing crown scribe lines in the direction of arrow 99 (parallel with the long dimension of the row), and camber curvature is primarily adjusted by scribing camber scribe lines in a direction in and out of the page (perpendicular with the long dimension of the row).

More generally, crown scribe lines extend over the back surface in a direction perpendicular with the intended direction of air flow over the ABS, and camber scribe lines extend over the back surface in a direction parallel with the intended direction of air flow over the ABS. Crown scribe lines and camber scribe lines do not produce exclusive effects. Crown scribe lines also tend to increase camber curvature, and camber scribe lines also tend to increase crown curvature.

It is noted that the curvature measuring tool 70 is preferably the apparatus of FIG. 7A, and preferably uses a phase sensitive receiver such as a lock-in amplifier 68. The laser scribing tool 74 can have many different kinds of scribing lasers. For example, the scribing tool 74 can have a pulsed 1.064 micron YAG laser. In a particular embodiment, a 1.064 micron Nd:Vanadate laser provides, on average, about 2 watts of optical power in the form of a 20–110 kHz pulse train where each pulse has a duration in the range of 5–500 nanoseconds, more preferably 10–100 nanoseconds (YAG lasers can also be used). It is undesirable to use a continuous (cw) laser because the resulting scribe lines will be too deep and the sliders will be heated excessively. Of course, mechanical scribers or microsandblasting tools can be substituted for the laser scribing tool 74. This is not preferred, however, because laser scribing tools tend to be faster and produce more accurate scribe lines. Also, mechanical scribing tools and microsandblasters are undesired because they increase curvature only if they are directed at the ABS side of the slider. Therefore, such tools must be operated alternately with the curvature measurement tool, preventing simultaneous scribing and curvature measurement.

The scribe lines can have a broad range of depths, from sub-micron (e.g. surface roughening) to tens of micron. However, excessively deep scribing tends to produce large amounts of particulate contamination, which can damage the sliders. Preferably, the scribe lines are in the range of 0.2–4 microns deep, and most preferably about 1 micron deep.

An object of the present invention is to provide all the sliders 20 with the same ABS curvature with little error. This desired curvature is termed the final target curvature. In operation, the curvature measuring tool 70 determines an initial curvature of each slider in the row 69. The curvature measurement for each slider 20 is sent to the computer 72. The computer determines a scribing pattern that, when scribed on the back surface 28 of each slider 20, changes the curvature of each slider. The curvature of each slider is changed to an intermediate value between the initial curvature and the final target curvature. The measurement/scribing process is repeated until the final target curvature is reached. Each slider 20 in the row 69 typically has a different initial curvature, and so requires a different pattern of scribe lines.

Figure 10:
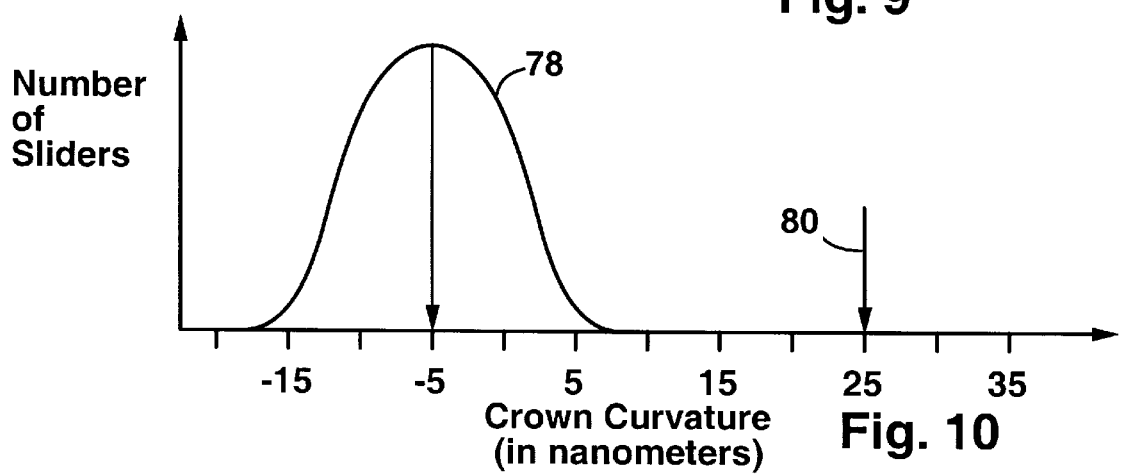
FIG. 10 shows an exemplary distribution curve of initial curvatures of different sliders in relation to a final target curvature.

When manufactured, each slider 20 typically has an inaccurately defined negative crown (i.e. the ABS surface is concave). However, for optimal fly height, it is best for the crown curvature to be slightly positive with little error. FIG. 10 shows a typical distribution plot of initial crown curvature 78 for sliders when they are first manufactured. A similar plot can be made for camber curvature. The distribution 78 is relatively broad and centered at a negative value of about −5 nanometers. For best flying characteristics, the ABS 26 of the sliders should have a well-defined final target curvature 80 (the desired curvature), which in this example is about +25 nanometers. The final target curvature 80 depends upon the design of the ABS 26, among other factors. It can be seen that the method of curvature adjustment must increase the curvature to a positive value and also decrease the standard deviation of the curvature distribution.

It is noted that the method of scribing the back surface 28 can only increase the curvature. The curvature change produced by removing material from the back surface 28 only goes in one direction. Therefore, if the final target curvature 80 is substantially exceeded, then the slider requires a substantial amount of additional processing with a mechanical scriber or microsndblaster to reduce the curvature.

It is noted that, although the following methods are discussed mainly in terms of crown curvature, the methods of the present invention apply equally well to adjusting camber curvature.

Figure 11:
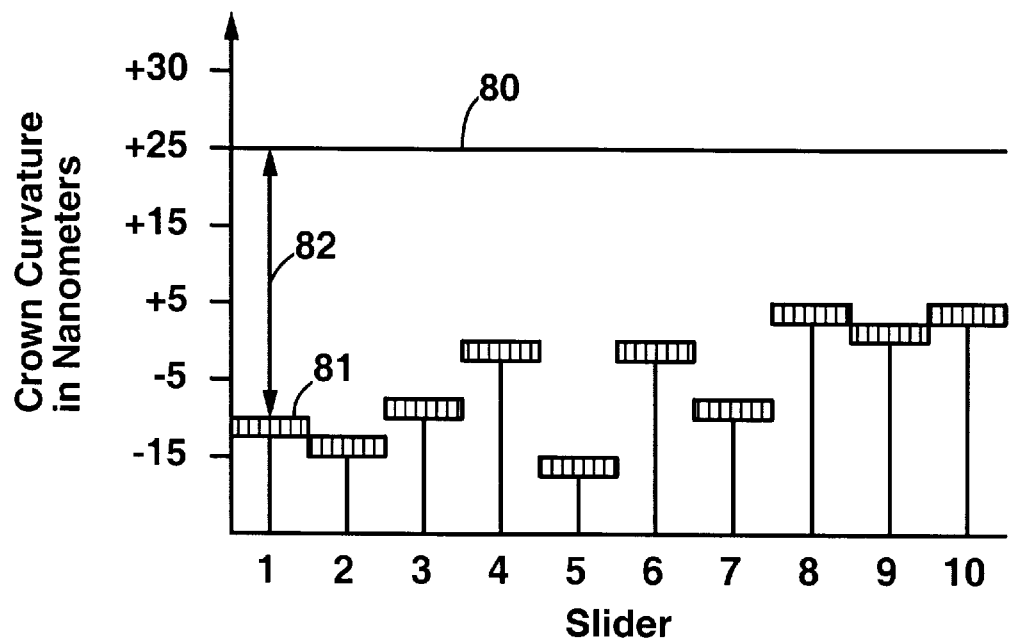
FIG. 11 shows a graph of different curvatures of a particular row of sliders.

In a first step of the present method, the crown curvature of each slider 20 in the row 69 is measured. This measurement preferably provides a measurement of the average curvature of the ABS 26. FIG. 11 shows an example of a set of average crown curvature measurements from a row 69 having 10 sliders 20. Next, a difference 82 between the initial, measured curvature 81, and the final target curvature 80 is determined for each slider.

In the present method it is strongly preferred for the entire difference 82 to be corrected in several steps (installments). This is because the process of increasing the curvature (i.e. scribing) is irreversible and the final target curvature 80 must not be exceeded. Therefore, the present method includes the process of repeatedly measuring the curvature 81, correcting a portion of the difference 82, and then repeating the measurement/scribing steps. The steps of measuring the curvature and scribing the lines are performed repeatedly. This process assures that the final target curvature 80 is not exceeded and that the final curvature of the slider is fairly accurate. The accuracy of the final curvature of the slider will depend upon, among other factors, how many measurement/scribing cycles (i.e. installments) are used for each slider.

Figure 12:
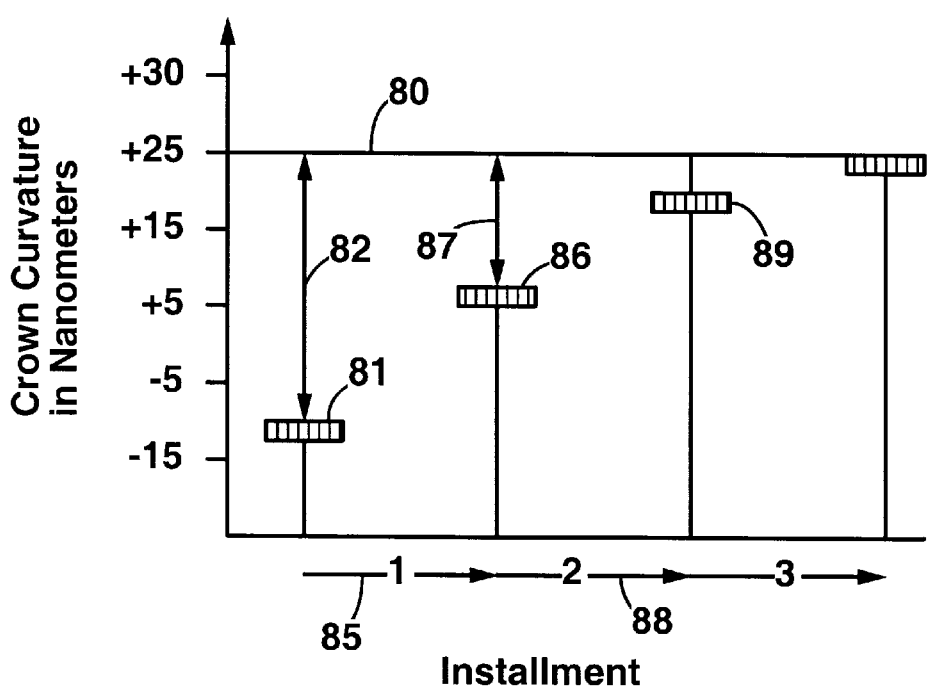
FIG. 12 shows how the curvature of a particular slider changes while being processed through installments in the method of the invention.

FIG. 12 shows a graph of the average crown curvature (i.e. averaged over the ABS) of a single slider at several :Installment stages during a process including three installments. The initial curvature of the slider 81 is measured and the difference 82 is determined as described above. A portion of the difference 82 is corrected for by a first installment 85 which includes scribing the back surface 28. After the first installment 85, the curvature is measured again and a second curvature 86 is found and a new difference 87 is determined. In a second installment 88, a portion of the new difference 87 is corrected to produce a third curvature 89. This process is repeated as many times as desired until the final target curvature 80 is achieved. More installments can generally provide sliders having more accurately defined curvature. Typically, 2–3 installments are sufficient for the sliders to achieve a curvature which is within about 1 nanometer of the final target curvature 80.

FIG. 13 shows curvature distributions for sliders before 90 and after 91 curvature adjustment according to the present invention. The method of the present invention changes slider curvature to the final target curvature and simultaneously reduces the standard deviation of slider curvature distribution.

An essential part of the present invention is the method used to determine the number and distribution of scribe lines necessary for a desired curvature change. For each slider during each installation, the number and distribution of scribe lines for the desired curvature change must be determined. The effect of a scribe line on the average curvature of the slider is dependent upon its location on the slider. FIG. 14A shows the back surface 28 of a single slider 20 with crown scribe lines 100 (i.e. scribe lines that primarily affect crown curvature, although they also affect camber curvature). Camber scribe lines (not shown) have an orthogonal orientation. Crown scribe lines 100 are oriented in a direction perpendicular to the direction of the disk motion 102. The graph of FIG. 14B illustrates the effect of crown scribe line location on curvature change. Scribe lines near a middle 104 of the slider have the greatest effect on curvature, almost 1.5 nanometers of curvature change for a single line (for this particular example). Scribe lines near leading edge 106A and trailing edge 106B of the slider 20 have very little or no effect on curvature. The graph of FIG. 143 can be determined empirically for any desired slider design. Also, a graph analogous to FIG. 14B can be made for camber scribe lines. It is noted that trailing edge 106B has delicate magnetic sensors for interacting with the magnetic data storage medium. The magnetic sensors can be damaged by the heat produced by scribing lines. For this reason it is necessary to establish a margin 107 within which no scribe lines may be scribed. For typical sliders, margin 107 may have a width of about 150 microns. A margin 109 may also exist at the leading edge 106A because scribe lines near the edges 106A, 106B are ineffective at changing curvature.

Figure 15:
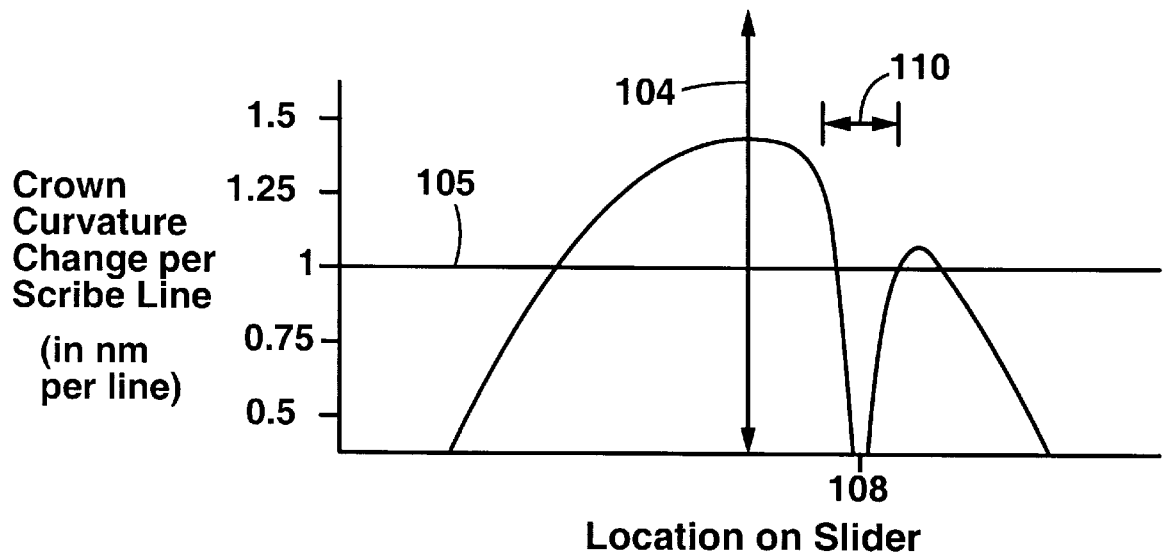
FIG. 15 shows a graph illustrating how two scribe lines located close together affect the net result on slider curvature.
Figure 16:
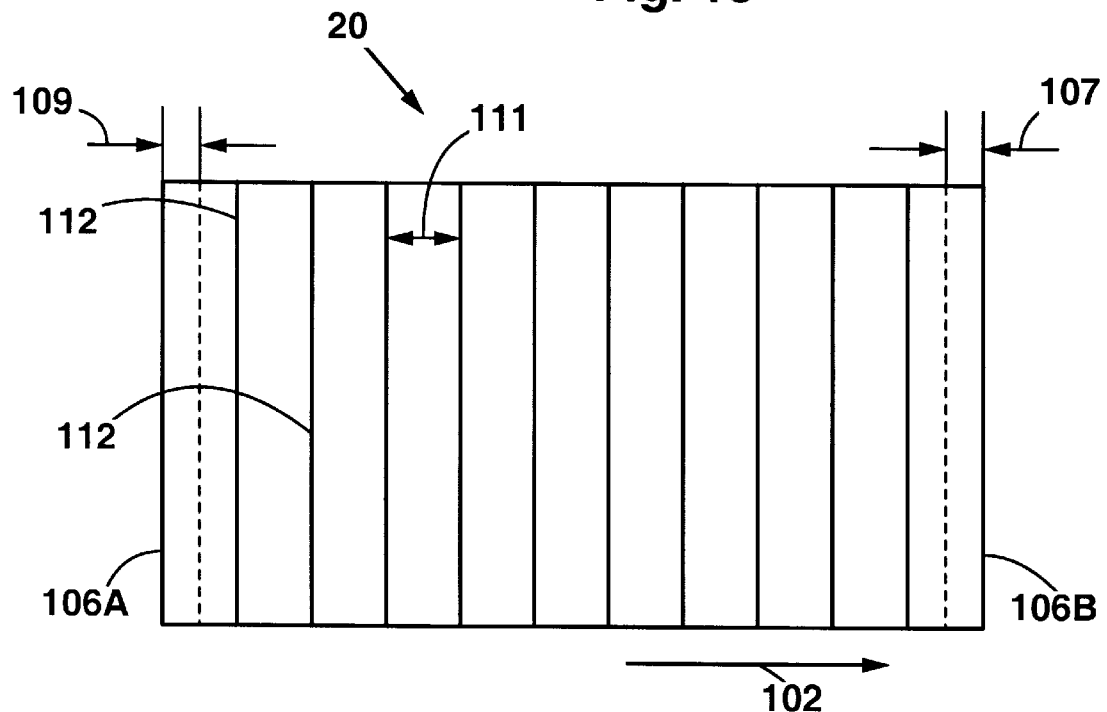
FIG. 16 shows the back surface of a slider with scribe line locations outlined.

The graph of FIG. 14B assumes that there is only a single scribe line on the slider 20. Scribe lines located close together do not behave independently to affect curvature, but rather have reduced effectiveness. FIG. 15 illustrates this point. Shown in FIG. 15 is a graph of curvature change for scribing an additional scribe line on a slider already having a scribe line at a location 108 (a graph analogous to FIG. 15 can be made for camber curvature). It can be seen from this graph that, since there is already a scribe line at location 108, scribing another line close to location 108 will have a reduced effect on the ABS curvature. A range 110 is shown within which a scribe line has a diminished effect upon curvature. The range 110 depends upon the depth of the scribe line at location 108 and the mechanical characteristics of the slider. For typical sliders which are about 300–400 microns thick with scribe lines about 2 microns deep, the range 110 is about 35–55 microns. Placing a second scribe line within range 110 results in the second scribe line having a greatly reduced effect upon curvature. Placing scribe lines outside of range 110 results in the scribe lines acting independently to affect curvature. The range 110 therefore approximately determines the maximum number of independently acting scribe lines which can fit onto a slider. For example, for crown curvature-affecting scribe lines, if a slider is 2000 microns long (length in the direction of air flow), the range 110 is about 50 microns, and margins 107, 109 are each 200 microns wide, then about 2000–400/50+1=33 independently acting crown scribe lines can fit on the slider. This maximum number of independent scribe lines determines a set of possible scribe line locations 112, shown in FIG. 16. The locations 112 are spaced apart by a distance 111 sufficient to ensure that neighboring scribe lines 112 act independently. A scribe line may or may not be scribed at each location 112. However, all scribe lines must be located at the predetermined locations 112.

Distance 111 can be in the range of about 5–200 microns, but is preferably in the range of about 20–80 microns, and is more preferably in the range of about 35–55 microns. These distances are applicable to both crown scribe lines and camber scribe lines.

Figure 17:
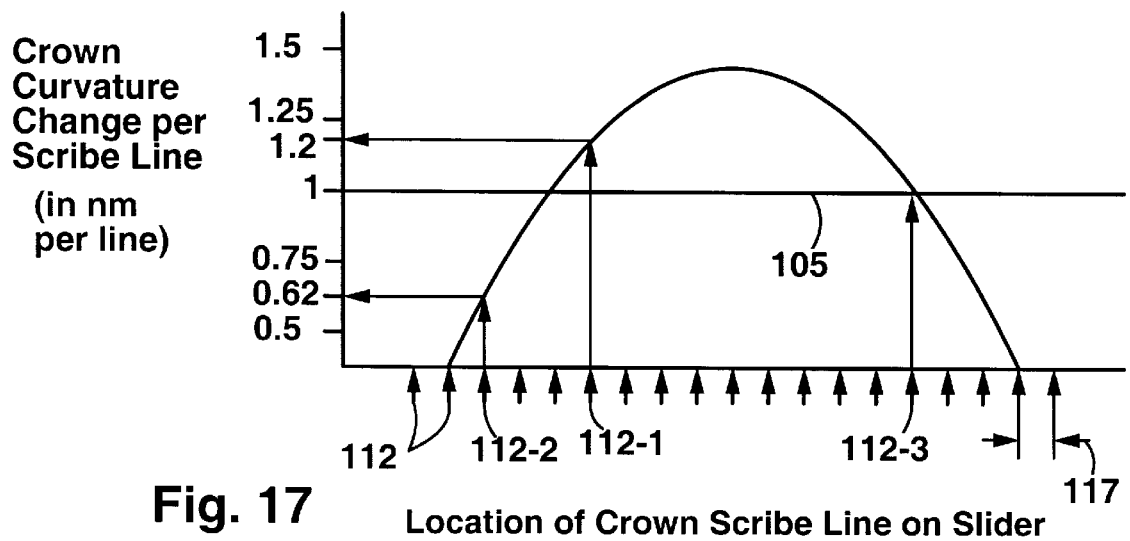
FIG. 17 shows a graph illustrating how to select scribe line locations to achieve a desired curvature change.

An average curvature contribution 105 for all scribe line locations 112 is shown in FIG. 17. The average curvature contribution 105 is the average curvature change per scribe line for all the scribe line locations 112. The significance of the average curvature contribution 105 is discussed below.

In the present invention, each installment of scribe lines is performed by selecting which scribe line locations 112 are to receive scribe lines. In each installment, the scribe lines 100 are distributed on the surface of the slider such that the average curvature change per scribe line (i.e. per scribe line that is actually scribed) is equal to the average curvature contribution 105 of all scribe line locations. This requirement ensures that the scribe lines are dispersed (i.e. not bunched together). In other words, if scribe lines are scribed near the middle of the slider (where the effect of a scribe line is greatest), then other scribe lines must be scribed near the periphery (i.e. near edges 106).

FIG. 17 shows a graph which can be used to determine which scribe line locations should receive scribe lines in a particular installment. The graph allows one to determine what effect each possible scribe line location 112 has on curvature. Each scribe line location 112 has an associated curvature contribution. For example, scribe line 112-1 has a curvature contribution of about 1.2 nm, scribe line 112-2 has a curvature contribution of about 0.62 nm, and scribe line 112-3 has a curvature contribution of about 1.0 nm. By adding up the curvature contributions of the individual scribe lines, the total curvature change can be predicted. For example, scribing lines 112-1, 112-2 and 112-3 will produce a curvature change of about 1.2+0.62+1.0=2.82 nm. The scribe line locations 112 are located far enough apart 117 so that they act independently and do not diminish each others effect on curvature.

Scribe lines 112-1, 112-2, and 112-3 approximately satisfy the average curvature change per scribe line requirement described above. The average curvature change for 112-1, 112-2, and 112-3 is 2.82 nm/3 lines=0.94 nm/line. This is rather close to the average curvature contribution for all scribe line locations 105, which is 1.0 nm per line. Equalizing the average curvature change and the average curvature contribution for all scribe line locations necessarily results in the scribe lines being dispersed over the back surface 28 of the slider.

Figure 18:
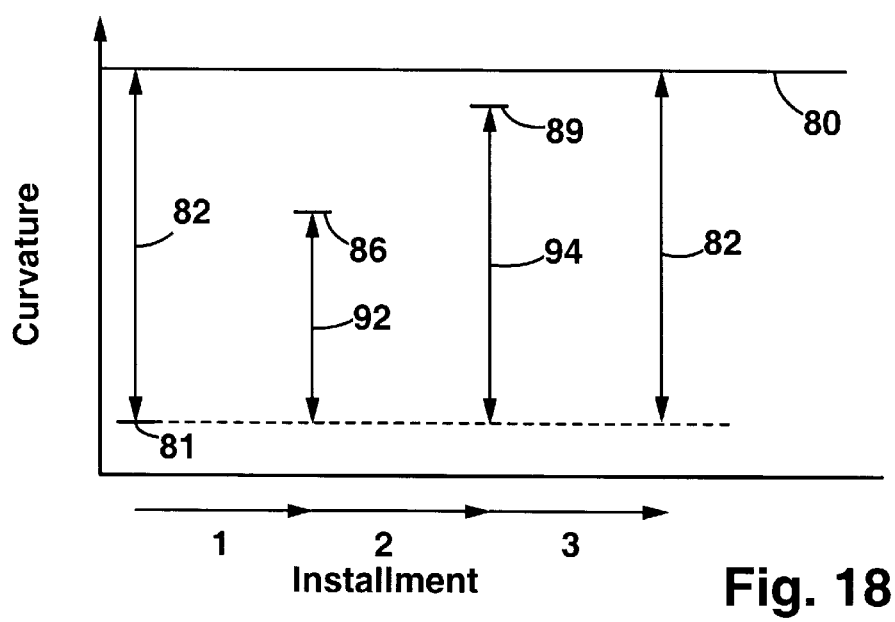
FIG. 18 illustrates the preferred method of the present invention in which a predetermined percentage of a measured curvature difference is corrected for in each installment.

Preferably, each installment of scribe lines is selected to compensate for a predetermined percentage of the initial curvature difference. This process is illustrated in FIG. 18, which illustrates the method in a 3-installment process. The initial curvature 81 is measured for each slider and the initial curvature difference 82 is determined between the initial and final target curvature 80. Intermediate percentages are then selected. The intermediate percentages determine what percentage of the initial curvature difference 82 is corrected for in each installment. In a particular exemplary embodiment, the intermediate percentages are 60% and 90%. This establishes a first intermediate percentage target 86 and a second intermediate percentage target 89. Targets 86, 89 are defined as being located a predetermined percentage distance from the initial curvature 81 and the final target curvature 80. In the 60–90 embodiment, the first intermediate percentage target 86 is 60% of the initial curvature difference (i.e. length 92 is 60% of length 82); and the second intermediate percentage target 89 is 90% of the initial curvature difference (i.e. length 94 is 90% of length 82). Each slider in a group may have different targets 86, 89 depending upon the initial curvature 81.

In the first installment, lines are scribed to achieve the first intermediate percentage target curvature 86. Then, in the second installment, the curvature is remeasured, and lines are scribed to reach the second intermediate percentage target curvature 89. Finally, in the third installment, lines are scribed to reach the final target curvature 80. Preferably, the intermediate percentages (i.e. 60% and 90%) are selected such that only 1–3 scribe lines are required in the final installment. If more Installments are desired, then more intermediate percentages must be specified (e.g., for 5 installments, 4 intermediate percentages are necessary). An advantage of this process is that it assures that every slider is processed through the predetermined number of installments, regardless of a sliders initial curvature.

It is noted that when scribing a number of sliders, each slider may have different intermediate percentage targets 86, 89, depending on the initial curvature 81. It is the intermediate percentages (i.e. ratio of difference 92 to difference 82 (60% in example above), and ratio of difference 94 to difference 82 (90% in example above)) which are the same between different sliders being processed according to this method.

Figure 19:
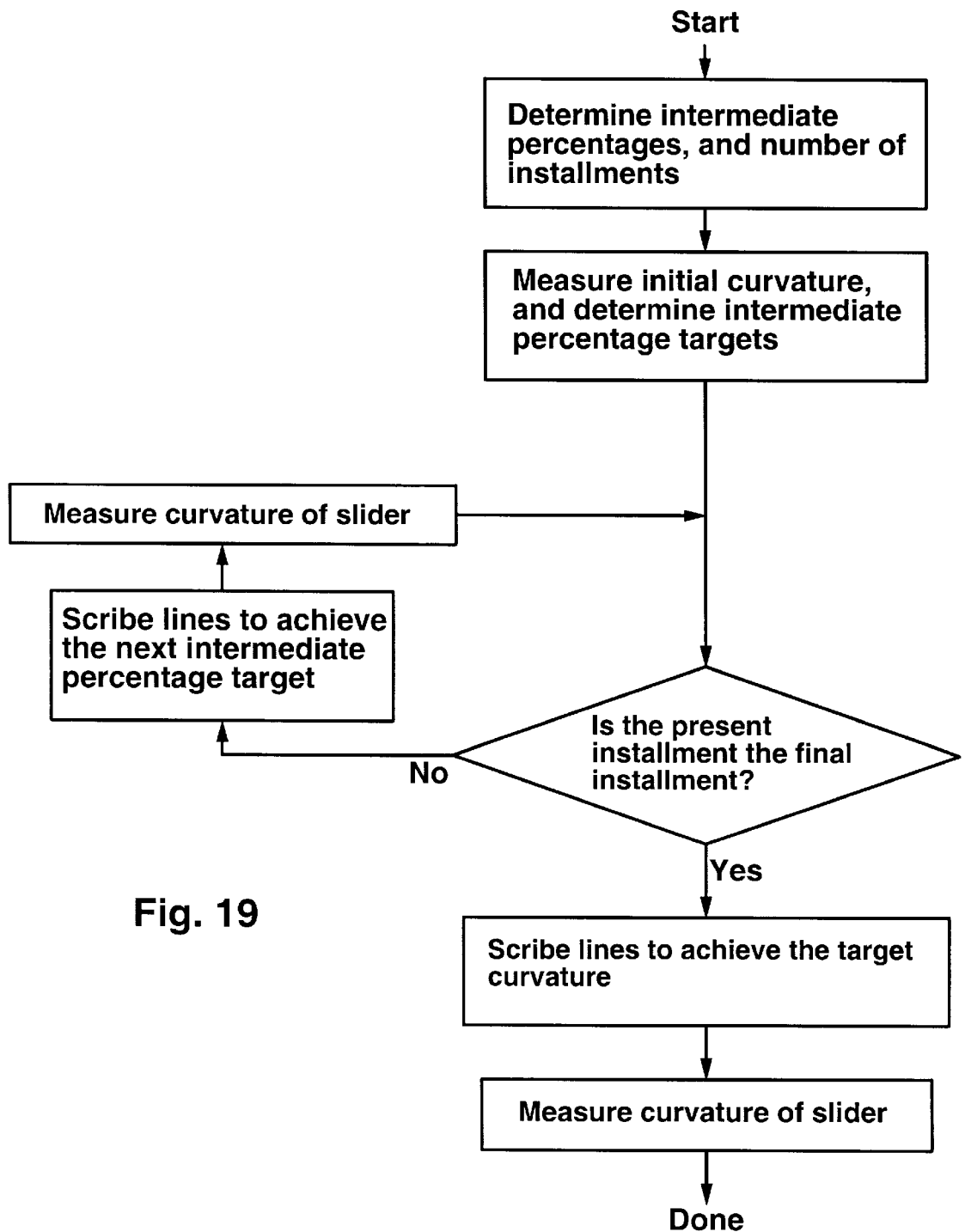
FIG. 19 is a flow chart illustrating a preferred method of repeatedly adjusting slider curvature by installments based on percentages.

As a specific, single-slider example, if a slider has an initial curvature of −15 nm and the final target curvature is +15 nm, then the initial curvature difference is +30 nm. The first installment is designed to correct for 60% of this curvature difference to bring the slider to a curvature of +3 nm. Next, the second installment corrects for 90% of the initial curvature difference to bring the slider to a curvature of +12 nm. In a third and final installment, 100% of the initial curvature difference is corrected for to bring the slider curvature to +15 nm. A flow chart illustrating the method of this preferred embodiment is shown in FIG. 19.

It is noted that the intermediate percentages can have a wide range of values. In a process with three installments, the first intermediate percentage can be in the range of about 40–95%, and the second intermediate percentage can be in the range of about 60–99%. More preferably, for a process with three installments, the first intermediate percentage is in the range of 60–80%, and the second intermediate percentage is in the range of 75–95%. For a process with two installments (and hence only one intermediate percentage target curvature), the intermediate percentage is preferably in the range of 70–90%.

In an alternative embodiment, each installment of scribe lines is designed to produce a predetermined intermediate target curvature in each slider. Each intermediate target curvature is between the initial curvature and the final target curvature. For example, consider a final target curvature of +15 nm and a group of sliders with an average initial curvature of −15 nm. A first intermediate curvature may be set at +5 nm, and a second intermediate curvature may be set at +12 nm. In the first installment, the curvature is measured and lines are scribed to produce the first intermediate curvature. Then, the curvature is remeasured, and a curvature difference between the measured curvature an(i the second intermediate target curvature is determined. Then, lines are scribed to produce the second intermediate curvature. Then, the curvature is measured again, and lines are scribed in the final installment to produce the final target curvature. Preferably, the intermediate target curvatures are selected such that only 1–3 scribe lines are necessary in the final installment. The intermediate target curvatures and number of installments may be selected empirically, and will depend upon the design of the sliders. A flow chart illustrating the process is shown in FIG. 20.

Therefore, in the present invention, there exist two methods of distributing the curvature adjustment among the installment steps. The methods of FIG. 19 and FIG. 20 are specific examples of curvature adjustment by repeatedly measuring and changing the slider curvature. The first method of FIG. 19 corrects for a predetermined percent of the initial curvature difference with each installment. The second method of FIG. 20 corrects for a predetermined amount of the curvature difference with each installment. In both methods, it is preferred to distribute the necessary curvature adjustment among the installments so that the final installment requires only 1–3 scribe lines. Minimizing the number of scribe lines needed in the final installment improves the accuracy of the process.

Figure 20:
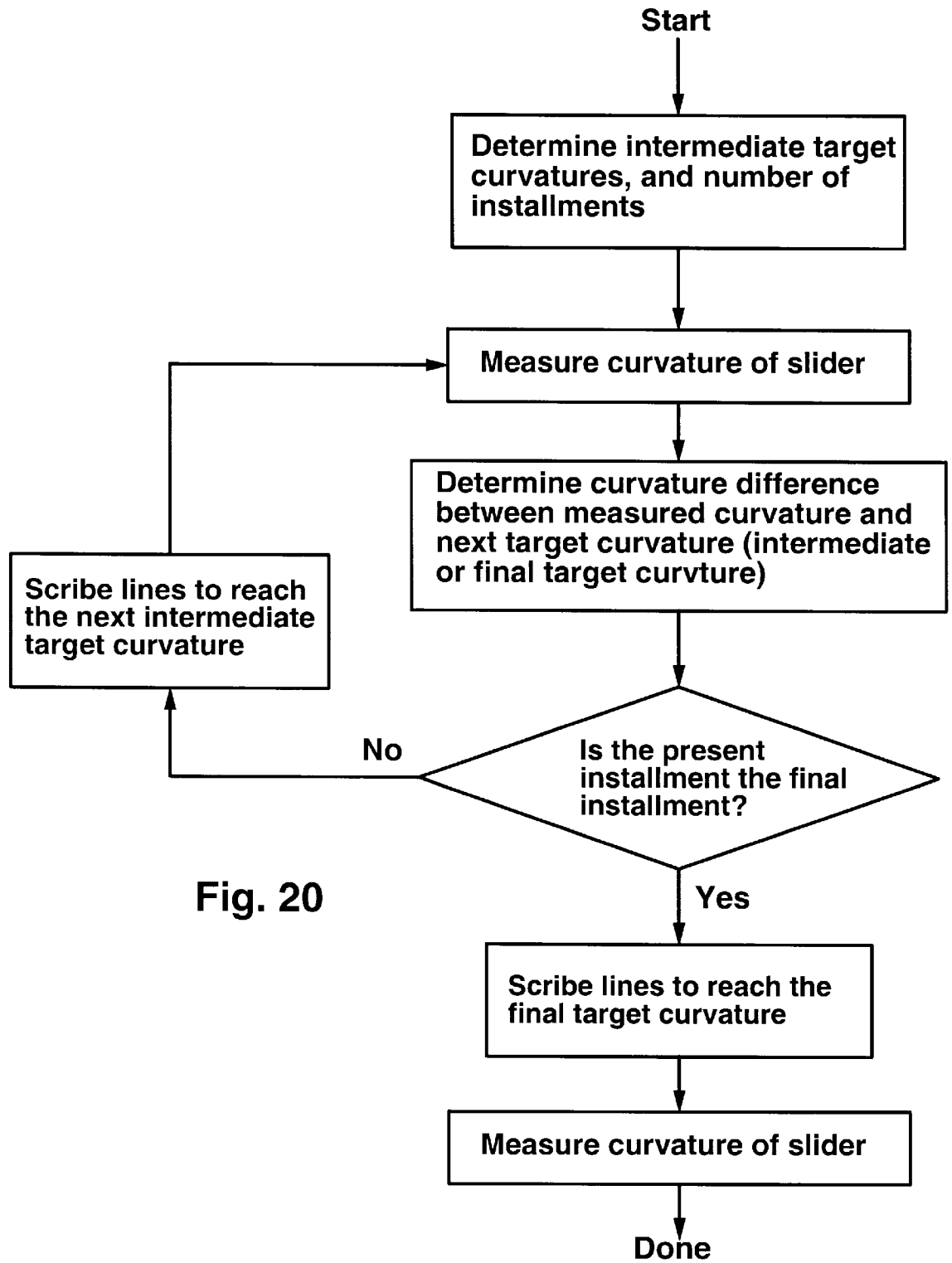
FIG. 20 is a flow chart illustrating a second method of repeatedly adjusting slider curvature by installments based on achieving intermediate target curvatures.

The methods of FIG. 19 and 20 are performed on individual sliders. The individual sliders may or may not be attached in row form, as shown in FIG. 9. The curvature of individual sliders can be separately adjusted even though the sliders are attached in row form.

Generally, any number of installments will work with either method (methods of FIGS. 19 and 20). If a large number of installments is used (by correcting a small amount of curvature in each installment), the sliders will have a more accurate curvature, but will require more time to process. More installment steps are necessary for sliders having a curvature which is far from the final target curvature, or for groups of sliders which have large deviation (range) of initial curvature values. For many applications, 3 installments are sufficient.

The method of curvature adjustment by repeatedly adjusting slider curvature in installments is preferably applied to sliders still attached in row form, as shown in FIG. 9. Each curvature measurement and scribing process is performed individually on each slider in the row.

It is noted that scribing a slider heats the slider. Heating can temporarily change the curvature of the slider. In the present invention it is preferred to allow the sliders to cool to the ambient temperature between installments. If the sliders are not allowed to cool adequately, then incorrect curvature measurements are produced and the sliders will have inaccurate curvature. Typically, 30 seconds or longer between installments is adequate. In a particularly preferred embodiment, an entire row of sliders is processed through one installment. Then, the entire row is allowed to cool before being processed through the next installment. Sufficient cooling time can be provided by loading many (e.g. about 10) slider rows into the scribing apparatus. A scribed slider row is allowed to cool while the other slider rows are being scribed. This method maximizes throughput while maintaining curvature accuracy.

Figure 21:
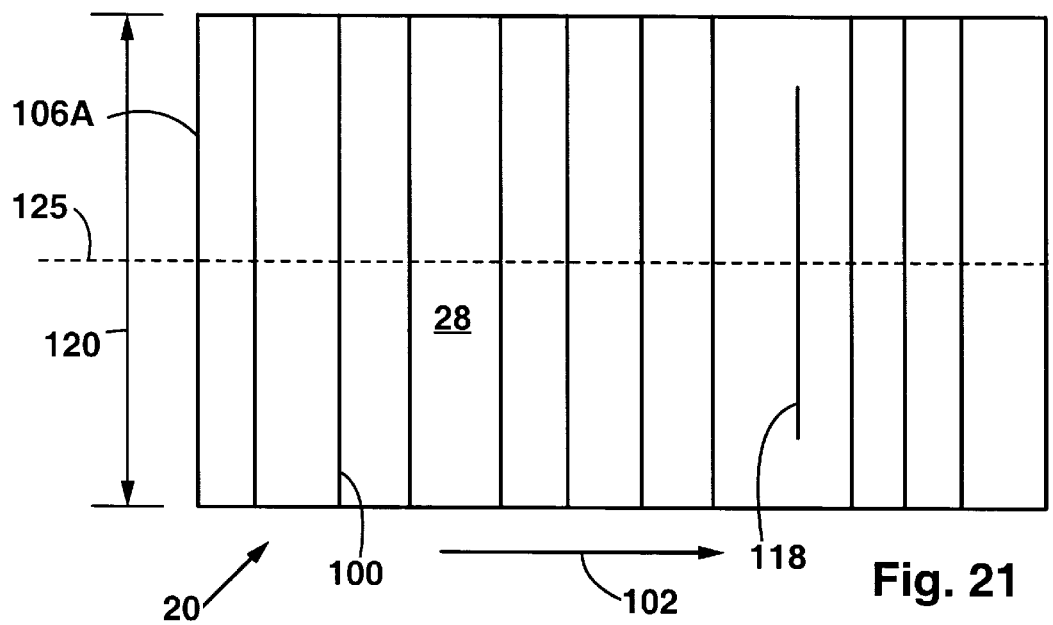
FIG. 21 shows a back surface of a slider having crown scribe lines which provide a desired crown curvature.

FIG. 21 shows the back surface 28 of a slider 20 which has been scribed according to the present invention to change crown curvature. The arrow 102 indicates the direction of disk motion (and air motion) over the air bearing surface 26 (the surface opposite the back surface 28) of the slider. The slider 20 has scribe lines 100 which extend a full width 120 of the slider. The slider also has a single partial scribe line 118 which does not extend the full width 120. Each slider 20 in a slider row will generally have a different pattern of scribe lines 100 and partial scribe lines 118. This is because, for most slider rows, each slider has a different initial curvature and therefore needs a different number and distribution of scribe lines to reach the final target curvature.

In all the installments except for the final installment, it is preferable that all lines scribed extend a full width 120 of the slider. In the final installment, a single partial scribe line 118 can be scribed if a full scribe line cannot be found which matches the curvature change required. A partial scribe line can be formed by placing a fast shutter (e.g. a fast electromechanical shutter with a open/shut time of less than about 1 millisecond) in the path of the scribing laser beam and closing the shutter at appropriate times during the scan of the scribing laser. The curvature effect from partial scribe lines is approximately proportional to the length of the line. Consider, for example, a case where a scribe line location having a curvature contribution of 1.5 nm is available (i.e. unscribed) for the final installment, but only 0.75 nm of curvature change is needed. Scribing a partial scribe line having half the full width 120 provides the desired 0.75 nm of curvature. The present invention includes individual sliders with partial scribe lines 118 which do not extend the entire width 120 of the slider 20. Preferably, partial scribe lines are symmetrically located about a crown centerline 125. When scribed according to the present method, sliders will almost never have more than a single partial scribe line. This is because partial scribe lines are only used when full scribe lines cannot generate the required amount of curvature change in the final installment. Most sliders will have a single partial scribe line, however.

Figure 22:
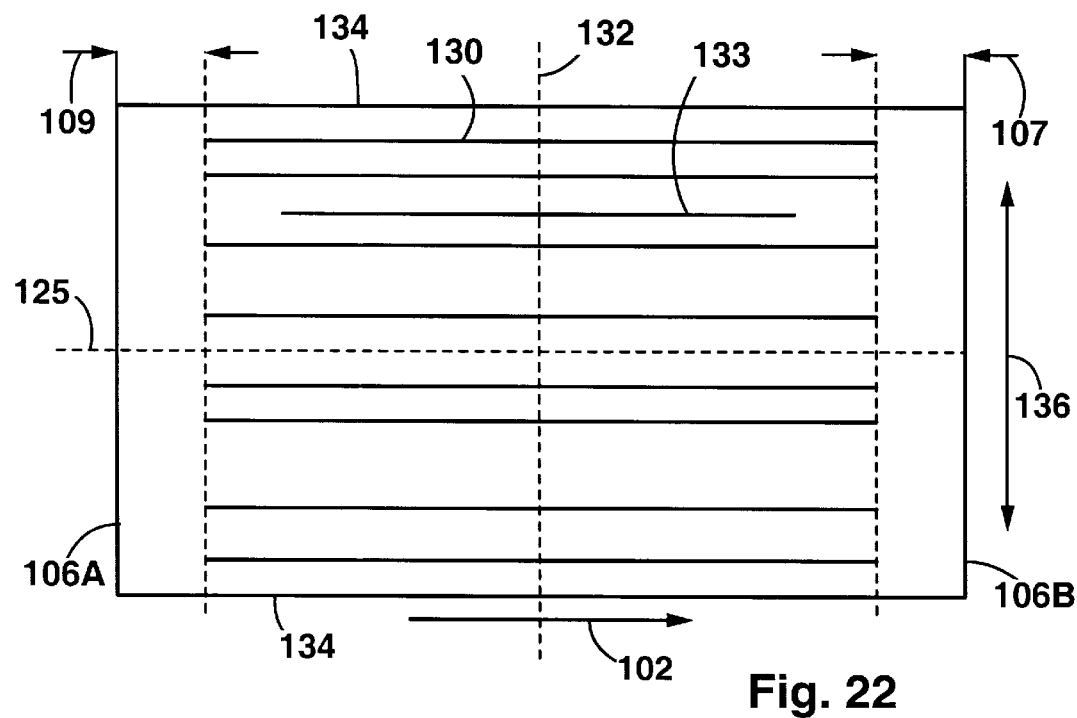
FIG. 22 shows a back surface of a slider having camber scribe lines which provide a desired camber curvature.

Although the present invention has been described mainly in terms of adjusting crown curvature, the methods of the present invention apply equally well to adjusting camber curvature. For example, the installment methods illustrated in FIGS. 19 and 20 apply equally well when adjusting camber curvature. FIG. 22 shows the back surface of a slider which has been scribed to adjust camber curvature. Camber scribe lines 130 are oriented in a direction parallel with the disk and air motion 102. Camber scribe lines 130 primarily affect camber curvature, although they also have an effect upon crown curvature. Margins 107, 109 prevent the camber scribe lines 130 from extending the entire width of the slider. Preferably, margins 107, 109 have the same width so that camber scribe lines are symmetrically located about a camber centerline 132. Symmetrically locating camber scribe lines 130 about the camber centerline 132 assures that the camber scribe lines provide a uniform camber curvature change across the slider. It is noted that camber scribe lines 130 have very little effect on camber curvature when located near sides 134, and have a large effect on camber curvature when located near centerline 125.

Camber scribe lines 130 are located in predetermined locations which are spaced apart a distance sufficient to ensure that neighboring camber scribe lines act independently. Partial camber scribe lines 133 can also be used. Partial camber scribe lines are designed and produced in the same manner as partial crown scribe lines.

FIG. 23 shows a graph of camber curvature change per scribe line vs. camber scribe line location. The graph is analogous to the graphs of FIG. 14B and FIG. 17. The graph of FIG. 23 is used in the same manner discussed above to determine which predetermined scribe line locations should receive camber scribe lines. Line 138 indicates the average camber curvature change for all possible camber scribe lines. Line 136 in FIGS. 22 and 23 shows the direction in which the graph is drawn. Line 132 indicates the location of the camber centerline 132 of FIG. 22. The method of locating camber scribe lines is substantially the same as the method discussed in terms of crown curvature.

FIG. 24 shows a slider which has a rectangular grid of scribe lines for correcting both crown and camber curvature. Crown curvature and camber curvature adjustments can be performed jointly.

Figure 25A:
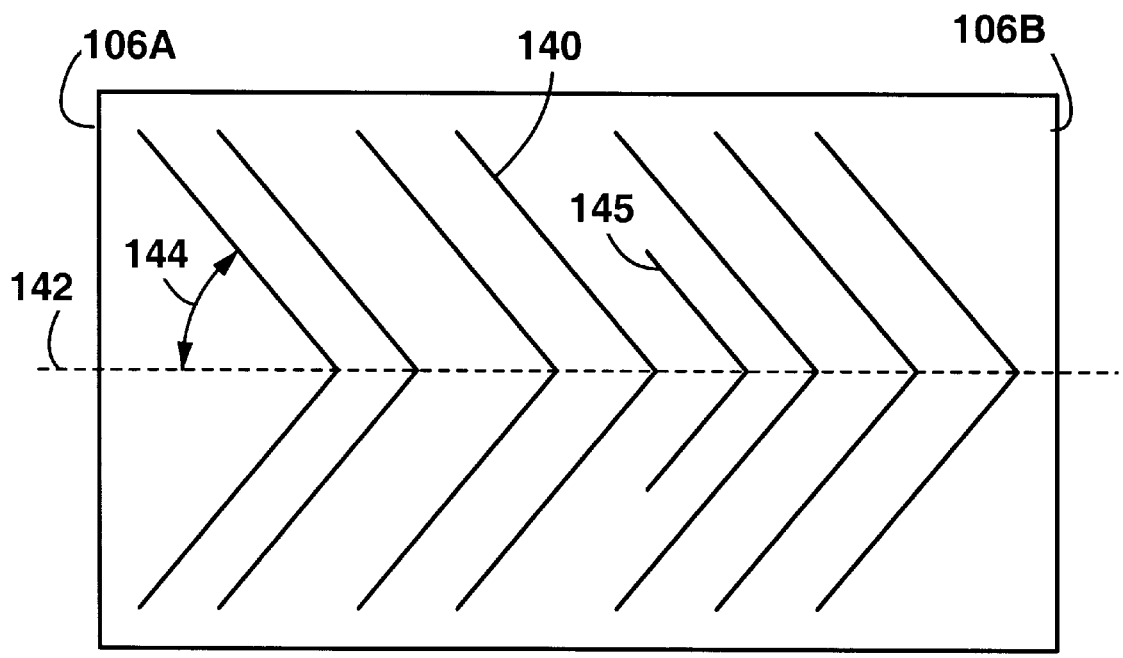
FIGS. 25A and 25B show sliders which have herringbone scribe lines that affect both crown and camber curvature.
Figure 25B:
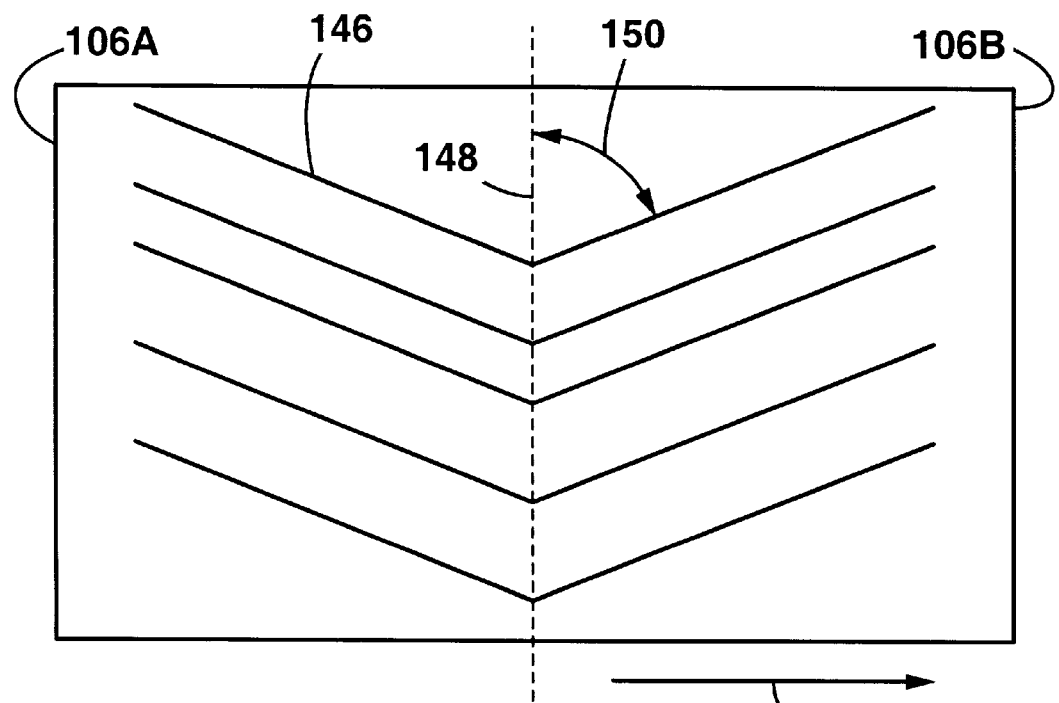

FIG. 25A shows a slider with herringbone scribe lines 140. The herringbone pattern is centered upon centerline 142. Herringbone scribe lines affect both crown and camber curvature. A scribe angle 144 determines how much the herringbone scribe lines affect crown and how much they affect camber. If the scribe angle 144 is small (i.e. about 0 degrees), then the herringbone scribe lines 140 primarily affect crown curvature. A 0 degree herringbone scribe line is equivalent to a crown scribe line. If the scribe angle 144 is large (i.e. about 90 degrees), then the herringbone scribe lines primarily affect camber curvature. A 90 degree herringbone scribe line is equivalent to a camber scribe line. Herringbone scribe lines can be made having different orientations. FIG. 25B shows a slider with rotated herringbone scribe lines 146 that are rotated 90 degrees compared to the herringbone scribe lines of FIG. 25A. The rotated herringbone scribe lines 146 are centered about a centerline 148. Rotated herringbone scribe lines 146 have the same effect on crown and camber curvature as herringbone scribe lines 140. Scribe angle 150 determines the relative effect on crown and camber curvature. Scribe lines 140 and 146 can also rotated 180 degrees compared to the orientations shown (i.e. herringbone scribe lines 140 may also point to the left, and herringbone scribe lines 146 may also point up). It is noted that partial herringbone scribe lines can be used. FIG. 25A shows a partial herringbone scribe line 145.

Figure 26:
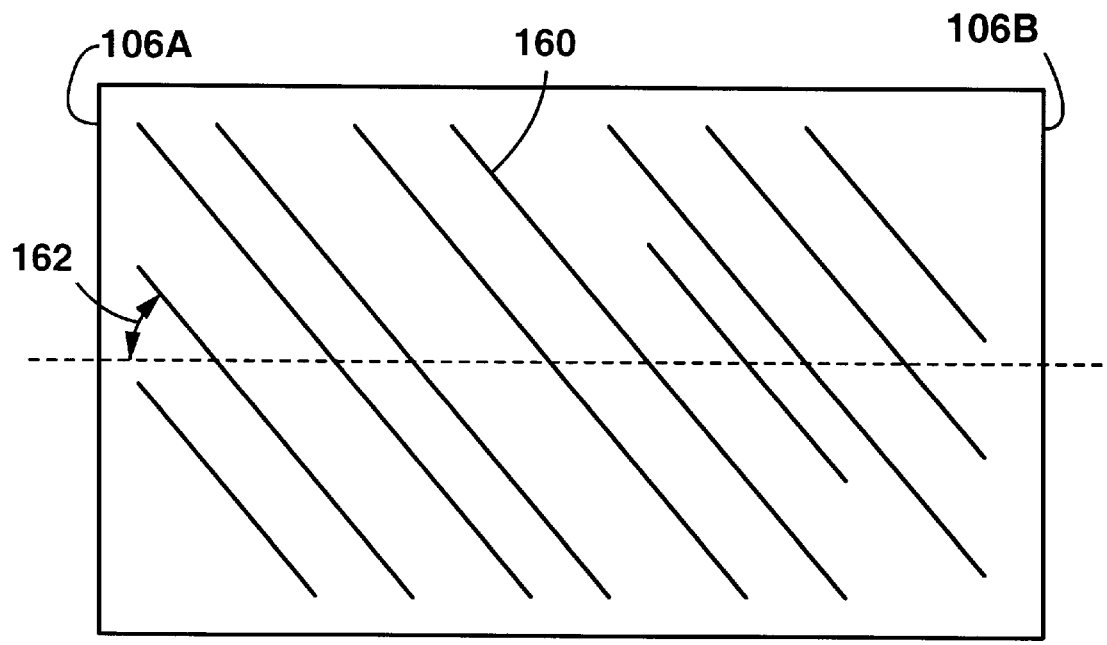
FIG. 26 shows a back surface of a slider which has angled scribe lines that affect both crown curvature and camber curvature.

FIG. 26 shows the back surface of a slider having angled scribe lines 160. Angles scribe lines 160 are used to simultaneously adjust crown and camber curvature. Angle 162 determines the relative effectiveness the scribe lines have in changing crown curvature and camber curvature. If angle 162 is about 0 degrees, then the scribe lines 160 primarily effect camber curvature. If the angle 162 is 90 degrees, then the scribe lines 160 primarily effect crown curvature. Angle 162 is measured from a canterlines 164 which is parallel with the intended direction 102 of air flow over the air bearing surface.

Figure 27:
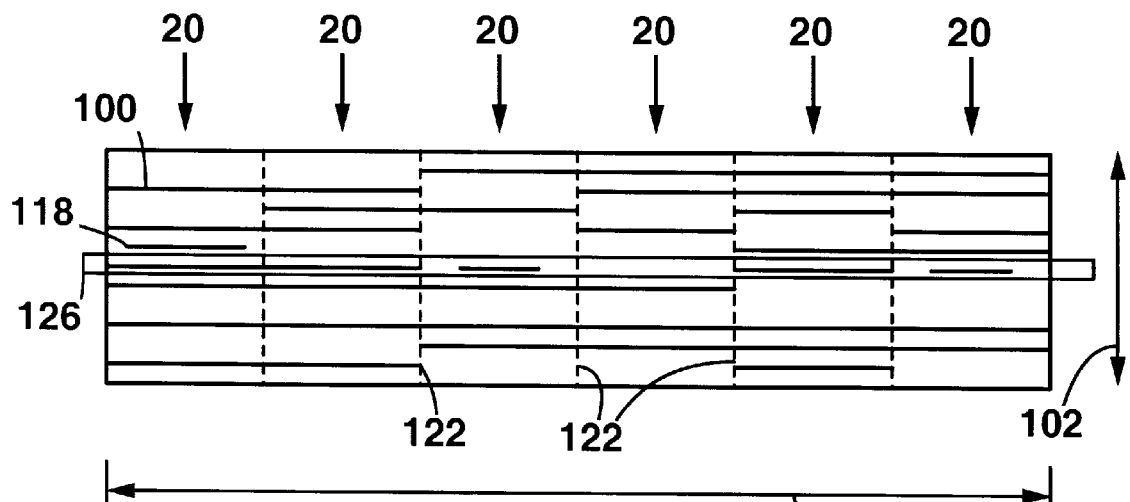
FIG. 27 shows a back surface of a row which has crown scribe lines.

As shown in FIG. 9, the present invention can be used to individually scribe sliders still attached in row form. FIG. 27 shows the back surface of 6 monolithically integrated (i.e. made of a single piece of material) sliders 20 still attached in row form which have been scribed according to the present invention. The length 128 of the row is perpendicular to the intended direction of air flow over the ABS. The scribe lines 100, and partial scribe lines 118 on individual sliders 20 can be considered to be portions of row-length crown scribe lines which extend the whole length 128 of the row. This is because the scribe line locations 112 are in the same corresponding locations on different sliders in the row. Box 126 contains a row-length crown scribe line. The present invention includes slider rows which have rowlength (crown scribe lines (e.g. row-length crown scribe line within box 126) which do not extend the entire length 128 of row. The row-length scribe line terminates at boundaries 122 between sliders where partial scribe lines 118 exist, or where neighboring sliders do not have a scribe line at all. The row-length scribe line in the box 126 is discontinuous across the length 128 of the row. Most sliders have a single partial scribe line 118.

It will be clear to one skilled in the art that the above embodiment may be altered in many ways without departing from the scope of the invention. Accordingly, the scope of the invention should be determined by the following claims and their legal equivalents.

What is claimed is:

1. An apparatus for measuring curvature of an air bearing surface of a magnetic head slider, the apparatus comprising:
   a) a position sensing optical detector;
   b) a two-dimensional scanner for receiving and angularly scanning a laser beam;
   c) a scan lens in optical communication with the scanner for collimating the scanned laser beam, the lens being located one focal length from the scanner, wherein the scan lens directs the laser beam towards the air bearing surface such that the laser beam reflects from the air bearing surface;
   d) a beamsplitter for directing the laser beam towards the position sensing optical detector after it is reflected from the air bearing surface, the beamsplitter being located between the scanner and the lens; and
   e) a phase sensitive receiver in communication with the detector and the scanner.

2. The apparatus of claim 1 further comprising a means for oscillating the scanner such that the laser beam is scanned over the air bearing surface.

3. The apparatus of claim 1 further comprising a sample-and-hold circuit in communication with the detector.

4. The apparatus of claim 1 wherein the position sensing optical detector is located coincident with the focal plane of the scan lens.

5. The apparatus of claim 1 wherein the position sensing optical detector is located so that it is not coincident with the focal plane of the scan lens.

6. The apparatus of claim 5 wherein the position sensing optical detector is located 1–3 millimeters from the focal plane of the scan lens.

7. The apparatus of claim 1 wherein the beamsplitter is a polarizing beamsplitter and further comprising a quarter-wave plate disposed between the beamsplitter and air bearing surface such that substantially all of the reflected laser beam is directed toward the position sensing optical detector.

8. The apparatus of claim 1 wherein an optical path length from the air bearing surface to the detector is in the range of 25–300 millimeters.

* * * * *